No. 897,768. PATENTED SEPT. 1, 1908.
C. L. NELSON.
CALCULATING MACHINE.
APPLICATION FILED NOV. 16, 1906.
12 SHEETS—SHEET 1.
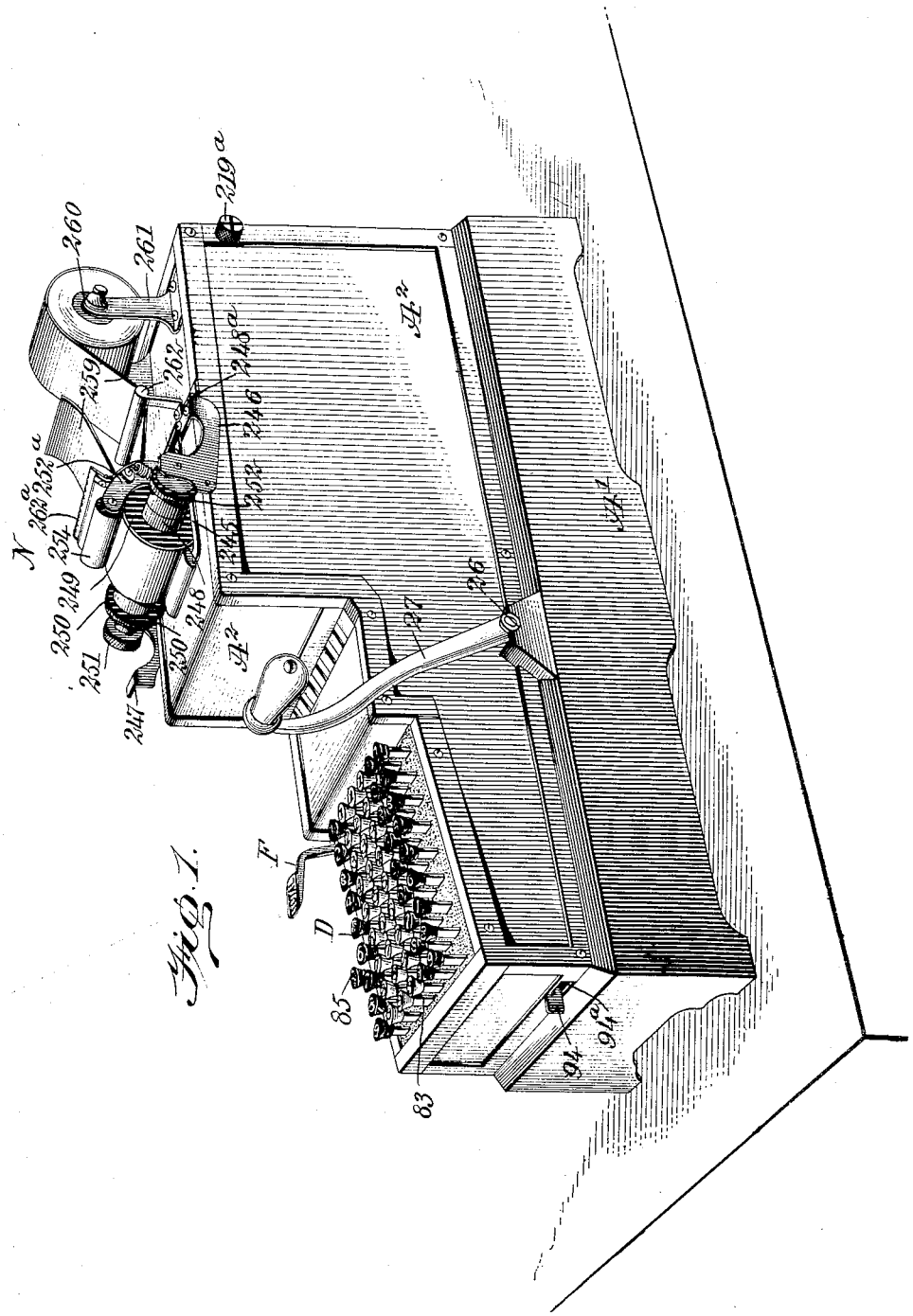
WITNESSES
INVENTOR
Carl L. Nelson
BY Munn & Co
ATTORNEYS No. 897,768.
PATENTED SEPT. 1, 1908.
C. L. NELSON.
CALCULATING MACHINE.
APPLICATION FILED NOV. 16, 1906.
12 SHEETS—SHEET 2.
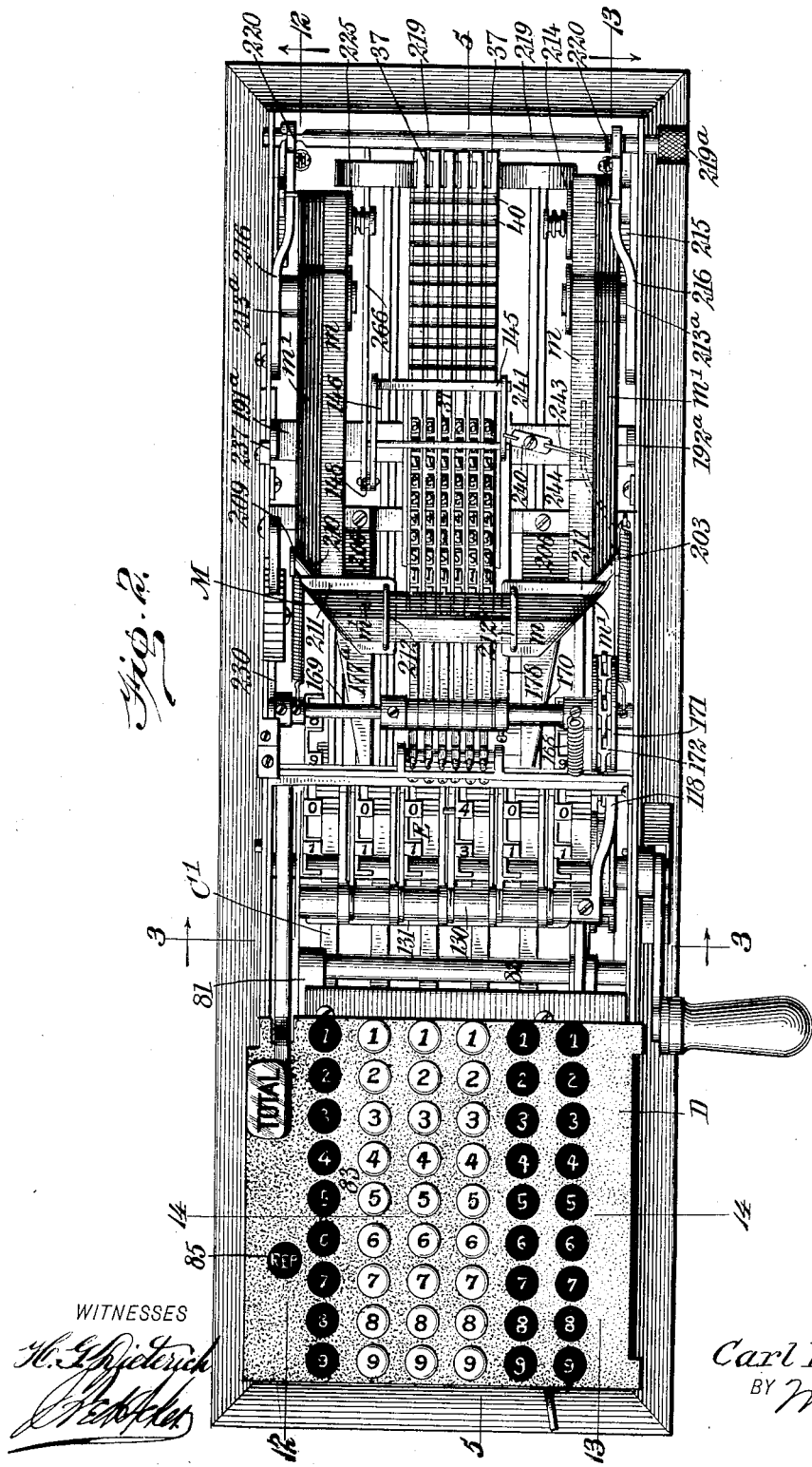
WITNESSES
INVENTOR
Carl L. Nelson
BY Munn & Co
ATTORNEYS

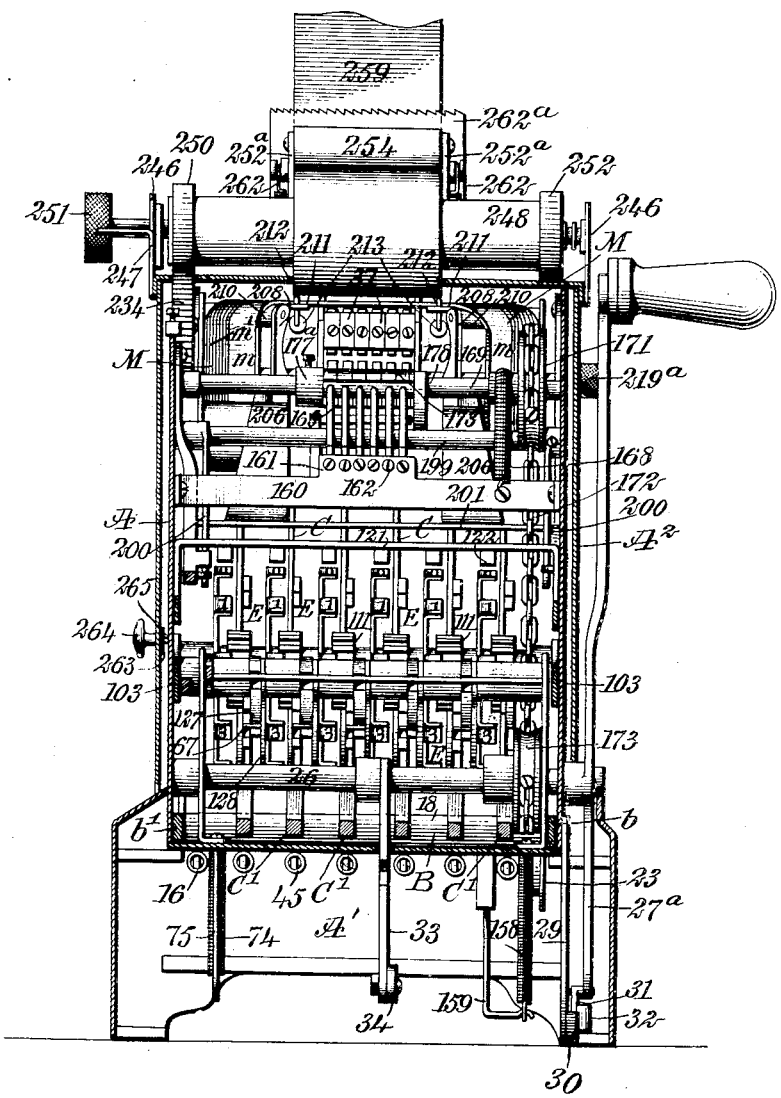

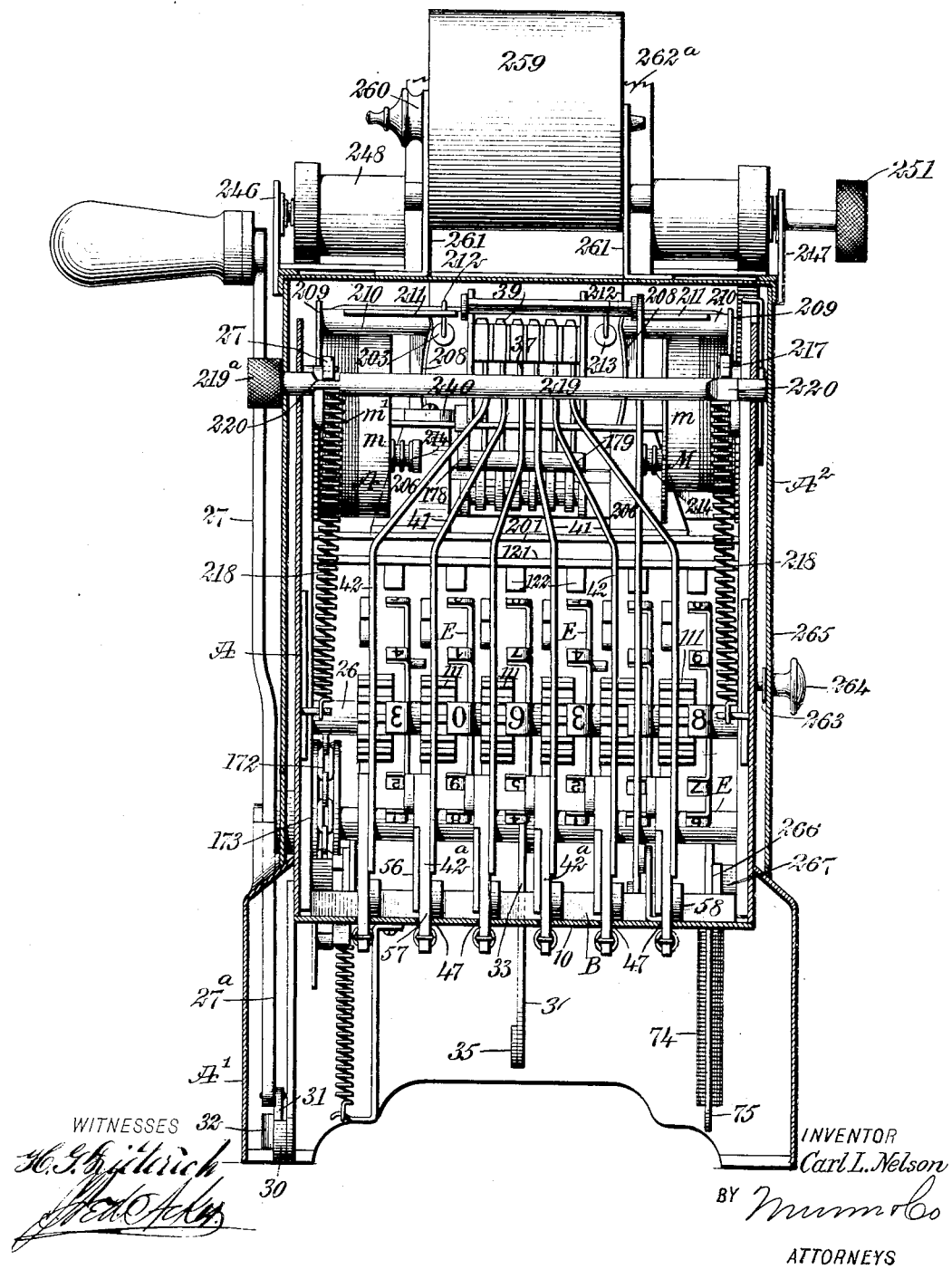

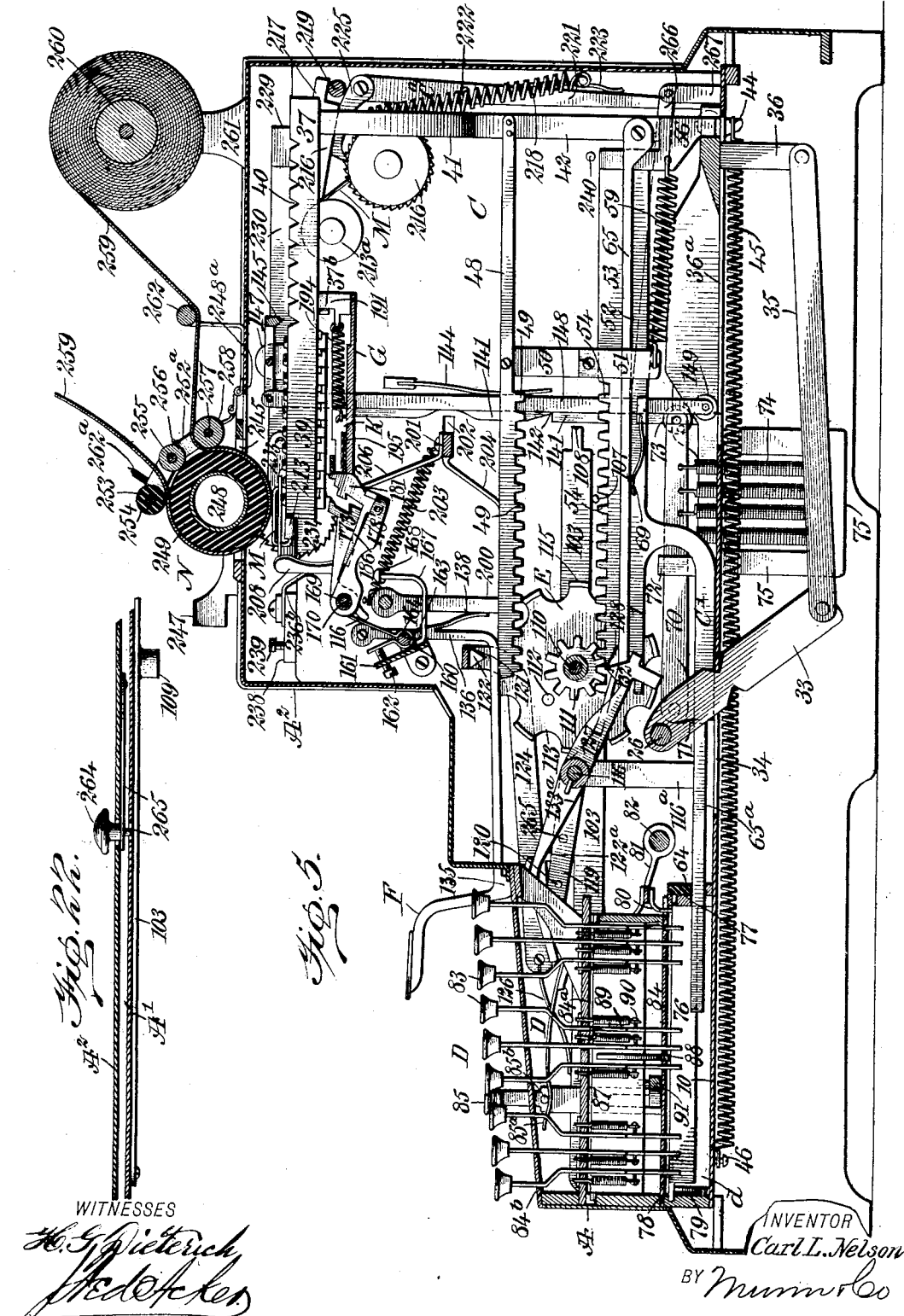

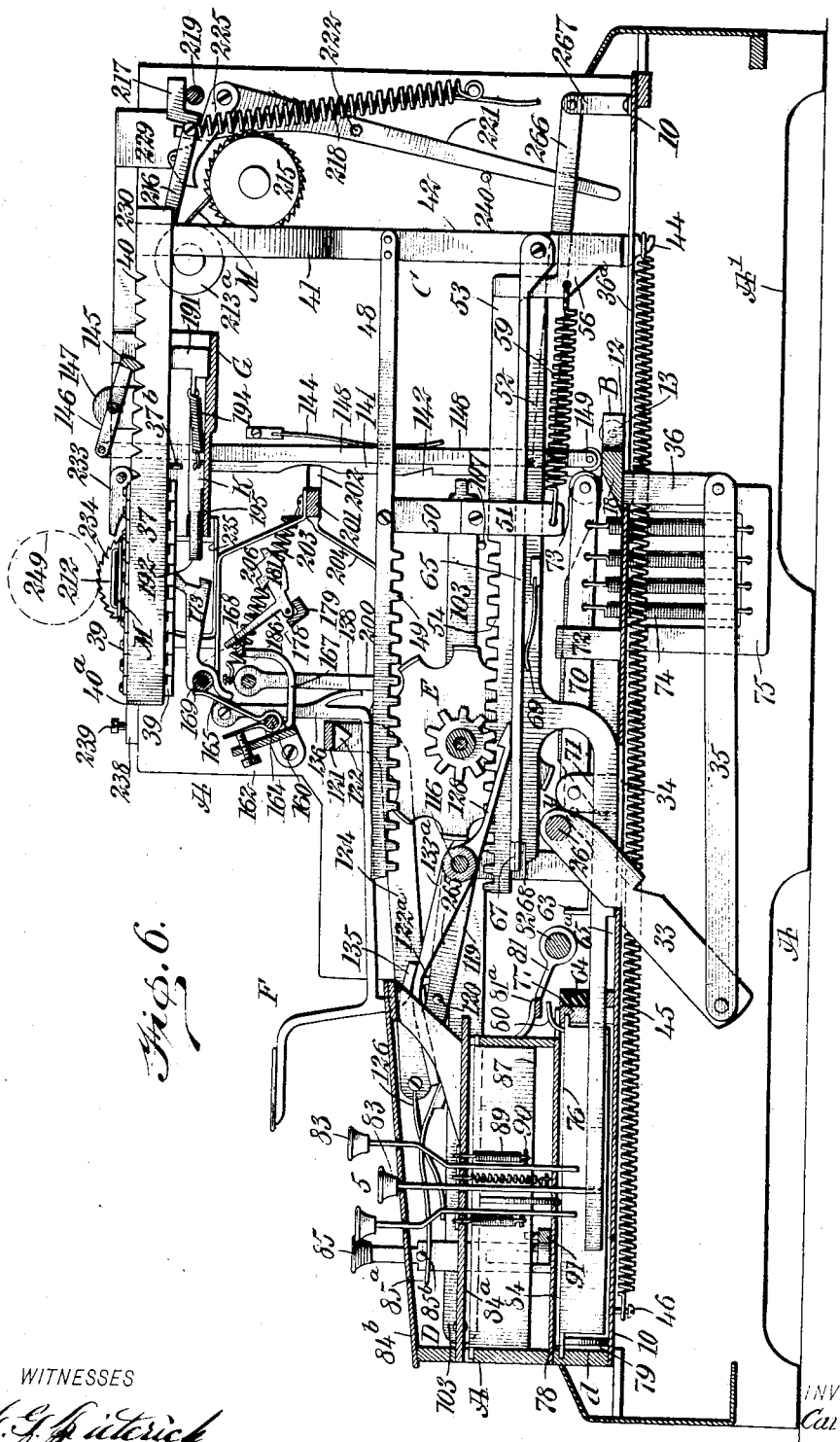

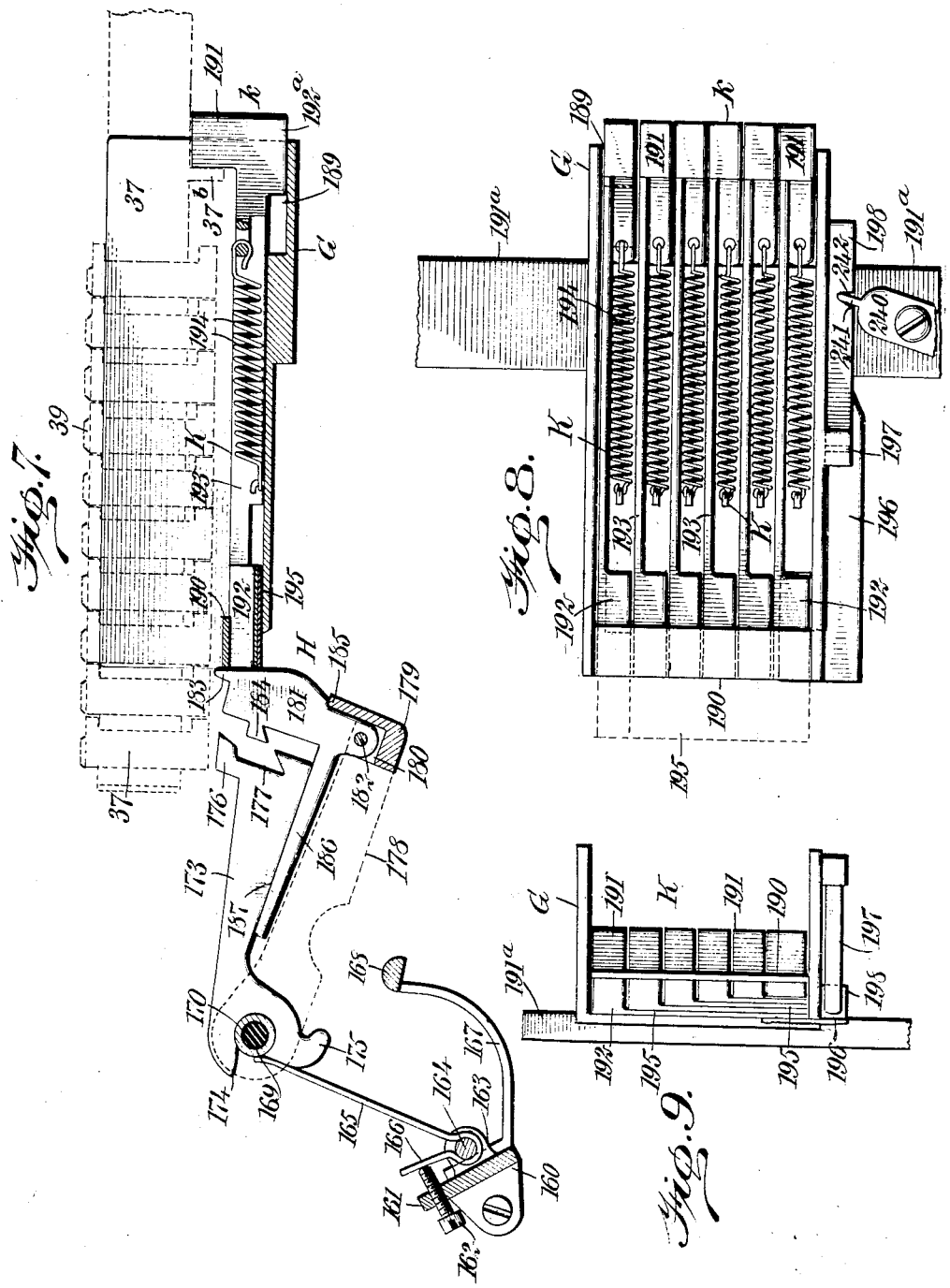

No. 897,768.
PATENTED SEPT. 1, 1908.
C. L. NELSON.
CALCULATING MACHINE.
APPLICATION FILED NOV. 16, 1906.
12 SHEETS—SHEET 8.
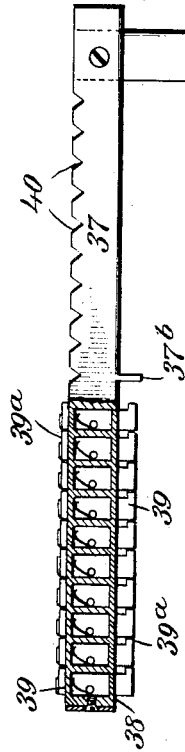
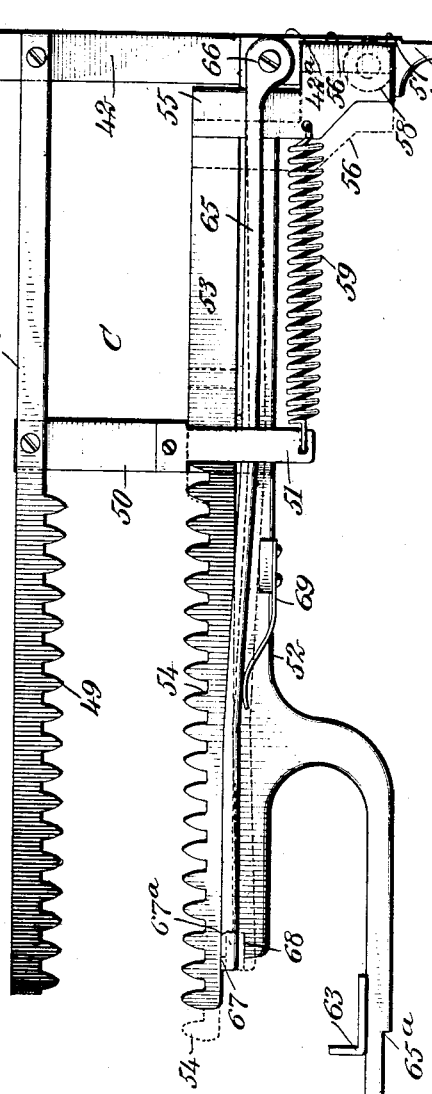
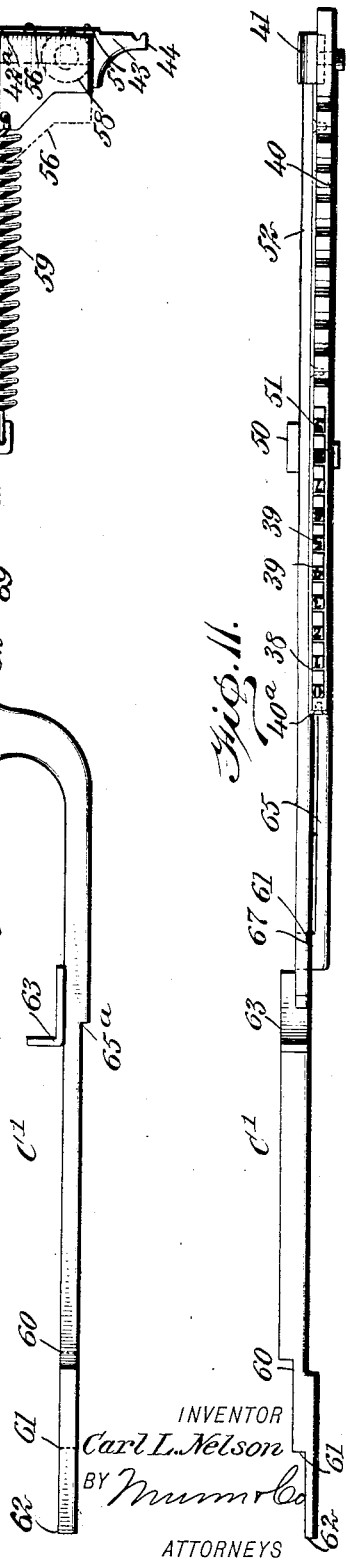
INVENTOR
Carl L. Nelson
BY Munn & Co
ATTORNEYS
WITNESSES No. 897,768. PATENTED SEPT. 1, 1908.
C. L. NELSON.
CALCULATING MACHINE.
APPLICATION FILED NOV. 16, 1906.
12 SHEETS—SHEET 9.
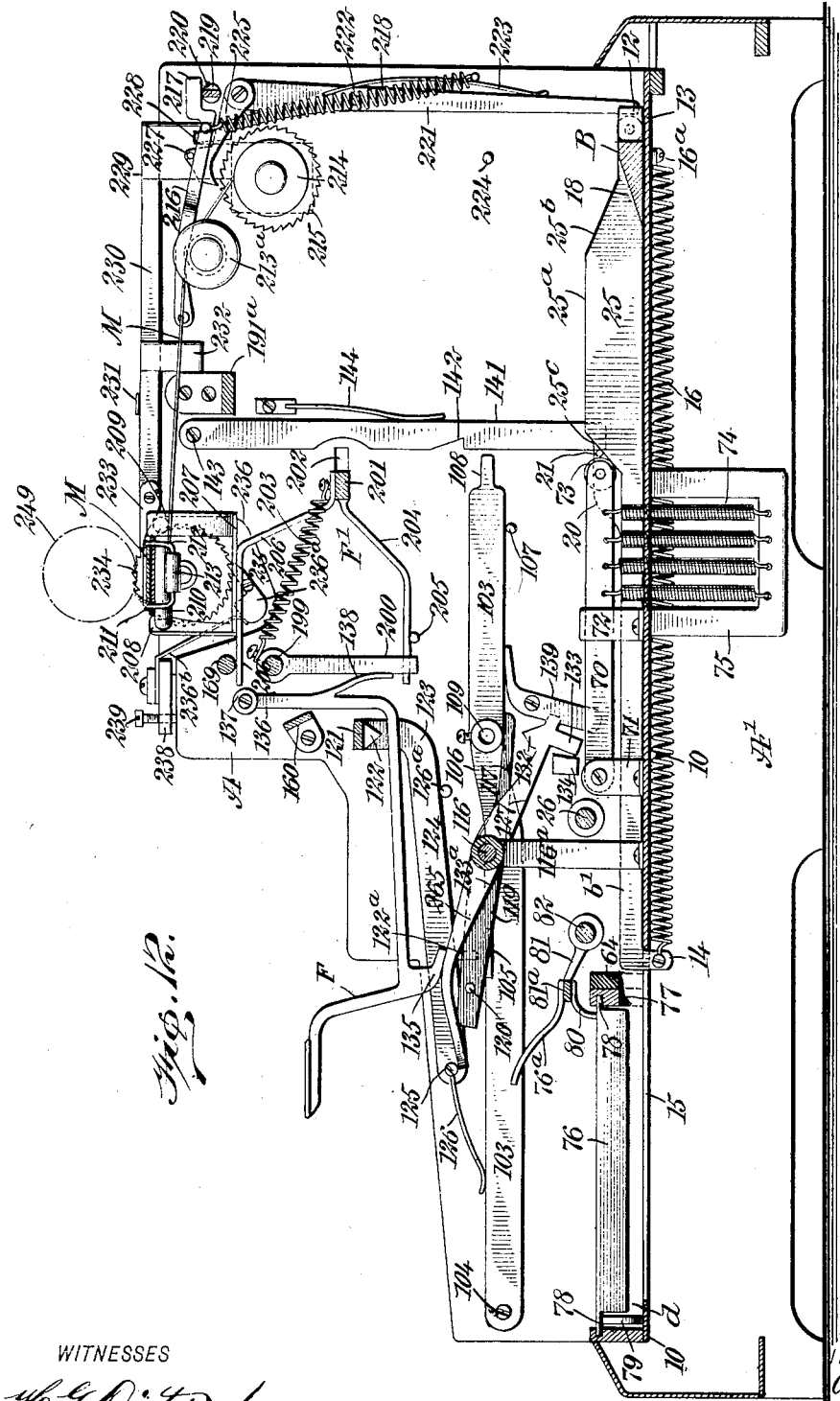
WITNESSES
INVENTOR
Carl L. Nelson
BY
ATTORNEYS

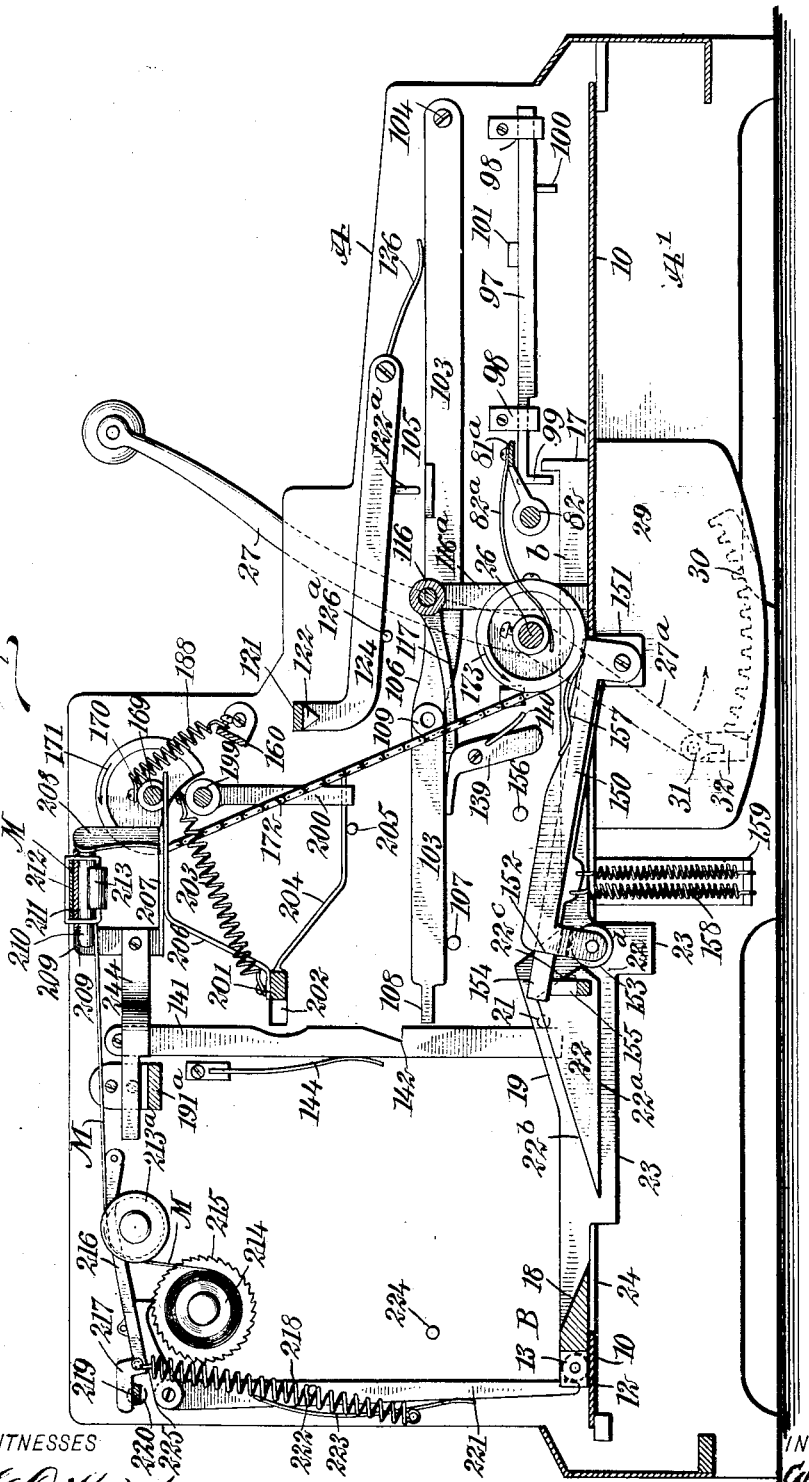

No. 897,768. PATENTED SEPT. 1, 1908.
C. L. NELSON.
CALCULATING MACHINE.
APPLICATION FILED NOV. 16, 1906.
12 SHEETS—SHEET 11.
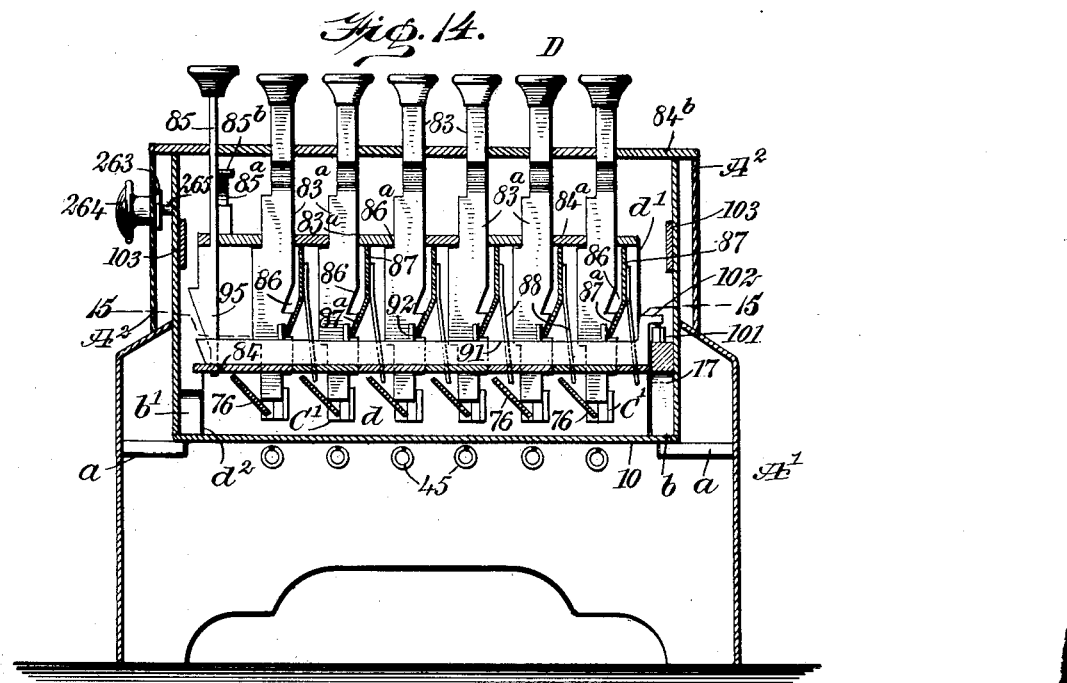
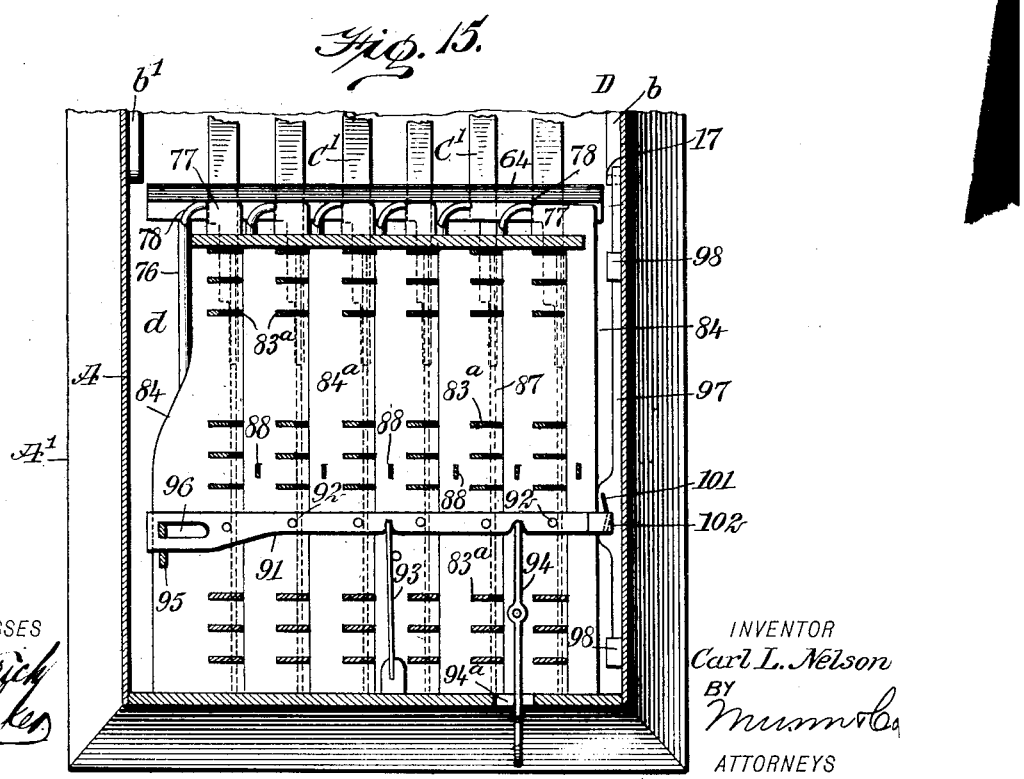
WITNESSES
INVENTOR
Carl L. Nelson
BY
ATTORNEYS No. 897,768.
PATENTED SEPT. 1, 1908.
C. L. NELSON.
CALCULATING MACHINE.
APPLICATION FILED NOV. 16, 1906.
12 SHEETS—SHEET 12.
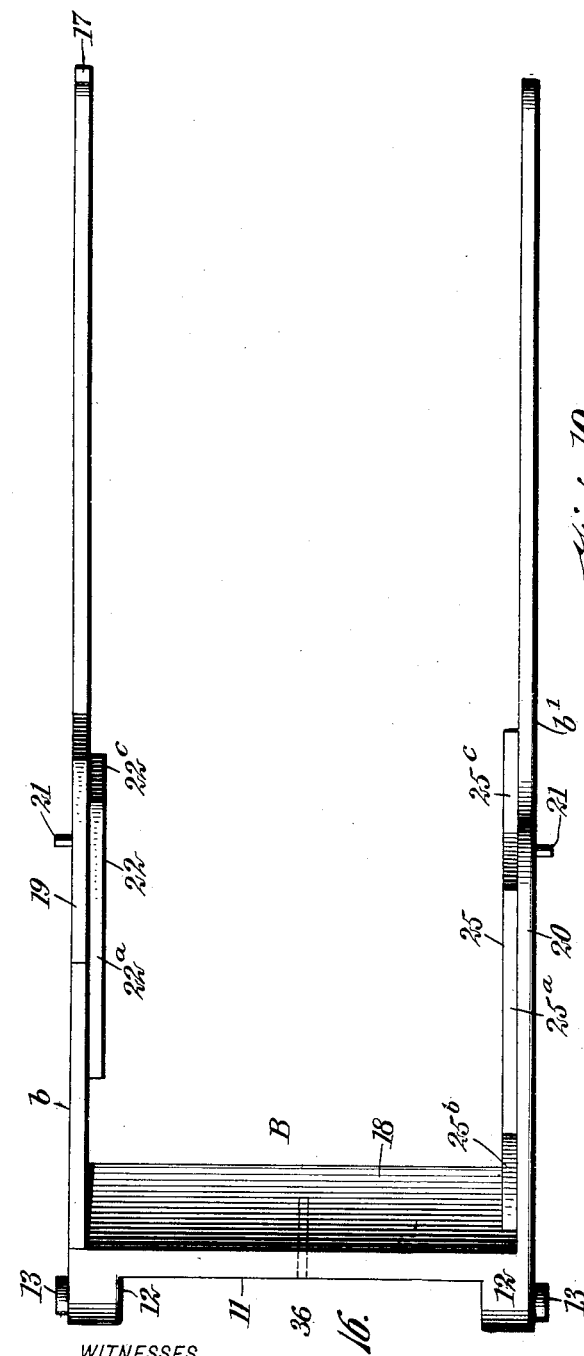
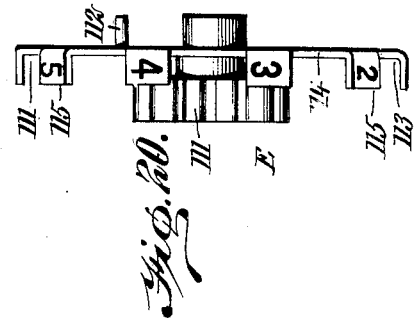
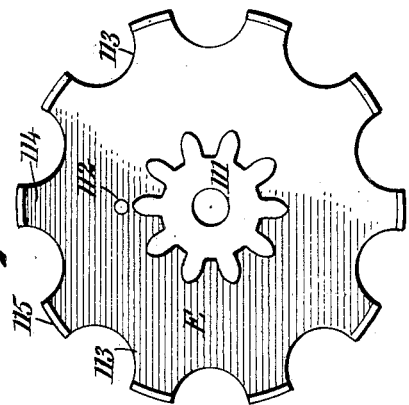
WITNESSES
INVENTOR
Carl L. Nelson
BY
ATTORNEYS

UNITED STATES PATENT OFFICE.

CARL L. NELSON, OF SEATTLE, WASHINGTON.

CALCULATING-MACHINE.

No. 897,768.　　　　Specification of Letters Patent.　　　　Patented Sept. 1, 1908.

Application filed November 16, 1906. Serial No. 343,713.

*To all whom it may concern:*

Be it known that I, CARL L. NELSON, a citizen of the United States, and a resident of Seattle, in the county of King and State of Washington, have invented a new and Improved Calculating-Machine, of which the following is a full, clear, and exact description.

The purpose of the invention is to provide a calculating machine that will tabulate, i. e. produce or print in column form the figures added by the mechanism of the machine and produce at the foot of the column the sum-total of the figures of the column in a different color of ink than that used to print the individual figures in the column.

A further purpose of the invention is to provide a mechanism whereby credits can be printed in red for example upon a slip delivered from the machine so as to appear in a column of figures to be added but remaining independent of such figures for an addition and the total of the figures, and whereby the total of any column of figures can be added to if necessary, and a grand total be obtained without in any manner interfering with the first total obtained and printed.

Another purpose of the invention is to provide a machine whereby perfect and uniform column work is obtained.

A further purpose of the invention is to provide a construction whereby multiplication as well as addition can be performed and by means of which an arbitrary sum can be added to the slip of tape at any time before it leaves the machine.

It is also a purpose of the invention to carry out the above-mentioned steps in a comparatively simple and direct and reliable manner, and to so construct and group all the working parts that they will not be liable to disarrangement, and whereby also reliable results will be obtained under all conditions of ordinary usage.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a perspective view of the machine; Fig. 2 is a plan view of the machine with the casing removed; Fig. 3 is a transverse vertical section taken practically on the line 3—3 of Fig. 2, looking in direction of the arrow; Fig. 4 is a rear elevation showing the casing in section; Fig. 5 is a vertical longitudinal section taken practically on the line 5—5 of Fig. 2; Fig. 6 is a similar view to that shown in Fig. 5, showing one of the keys pressed and the parts in a position ready to print a number; Fig. 7 is an enlarged detail longitudinal sectional view of the hammer mechanism and the controlling means for the hammer mechanism; Fig. 8 is a plan view of the hammer controlling means shown in Fig. 7; Fig. 9 is an end view of the same; Fig. 10 is a side elevation partly in section, of one of the type bars; Fig. 11 is a plan view of the same; Fig. 12 is a longitudinal vertical section taken substantially on the line 12—12 of Fig. 2; Fig. 13 is a longitudinal vertical section taken practically on the line 13—13 of Fig. 2; Fig. 14 is a vertical transverse section through the key-board, the section being taken practically on the line 14—14 of Fig. 2; Fig. 15 is a horizontal section taken substantially on the line 15—15 of Fig. 14; Fig. 16 is a plan view of the carriage removed from the machine; Figs. 17 and 18 are detail views of controlling levers for the type wheels; Fig. 19 is a side elevation of one of the type wheels; Fig. 20 is an edge view of the same; Fig. 21 is a sectional side elevation of a portion of the lower rack of a type bar and locking device; and Fig. 22 is a detail sectional view through a portion of the outer casing of the machine and the stop latch for the adding mechanism carried thereby.

The casing A may be of any desired form and is provided with a bottom 10 upon which bottom a carriage B is mounted to slide to and from the forward portion of the said bottom, the normal position of the rear end of the carriage being near the rear end of the machine and the normal position of the front portion of the carriage being in engagement with the forward portion of the machine as shown in Fig. 12.

The carriage extends nearly the width between the sides of the casing, or the width of the floor 10 upon which it has sliding movement. The carriage is shown in detail plan view in Fig. 16 and is constructed of metal. In the detail of its construction a rear member 11 is provided, the outer or rear face whereof is straight; and from the sides of the carriage at the end portions of the end member 11, rearwardly-extending lugs 12 are formed; and at the outer face of each lug 12 a friction roller 13 is mounted. These friction rollers serve to render the movement of the carriage more or less free on the floor or partition 10, and likewise act at their rearward movement to bring about certain movements on the part of the ribbon-controlling mechanism, as will be hereinafter particularly described.

In addition to the parts named, the carriage consists of parallel side members $b$ and $b'$, the member $b$ being the right-hand side member and the member $b'$ the left-hand side member. The forward face of the end member 11 of the carriage is downwardly and forwardly inclined, as is shown at 18 in Figs. 5, 6, 12, 13 and 16; and this inclined surface 18 at the forward movement of the carriage operates a type-alining device also to be hereinafter described.

The upper edge of the right-hand side member $b$ of the carriage B is provided with an upward extension 19, shown particularly in Figs. 13 and 16, the extension being preferably of triangular shape as is particularly shown in Fig. 13. A corresponding projection 20 is provided for the left-hand side member $b'$ as is illustrated in Figs. 5, 12 and 16. Alining pins 21 extend horizontally from the outer faces of the said side members $b$ and $b'$ at the aforesaid extensions 19 and 20, and these pins, as will be hereinafter described, are adapted in the forward movement of the carriage to permit a locking device for the adding wheels to operate to hold the same in an upper position and at the rearward movement of the carriage tend to release the said wheels from said device as will be also hereinafter fully described.

A cam track 22 is produced upon the inner face of the projection or extension 19 from the right-hand side member of the carriage. Said track, as is particularly shown in Fig. 13, is provided preferably with a straight under surface $22^a$, an upwardly and forwardly inclined upper surface $22^b$, a downwardly and forwardly-inclined forward surface $22^c$ and a lower rearwardly-inclined surface $22^d$. The projection 19 extends not only up but also down below the body of the right-hand member $b$ of the carrier as is shown in Fig. 13, which lower extension is designated as 23 and is below the cam track 22, being adapted to travel in a longitudinal slot 24 made in the bottom 10 of the casing at its rear as is also shown in Fig. 13.

At the inner face of the left-hand member $b'$ of the said carriage a projection 25 is made, corresponding to the cam 22 at the opposite side of the carriage, and said projection 25, as is clearly shown in Figs. 5 and 12, consists of a straight horizontal upper face $25^a$, a downwardly and rearwardly inclined rear edge $25^b$ and a downwardly and forwardly inclined forward edge $25^c$. The objects of the elements 22 and 25 will be shortly explained in detail.

The forward end of the left-hand carriage member $b'$ is carried down to form a lug 14 that extends into a longitudinal slot 15 produced in the bottom 10 at the forward left-hand portion thereof as is illustrated in Fig. 12; and a spring 16 is attached to the lug 14 and to the under face of the bottom 10 of the casing near the rear of the latter as is indicated at $16^a$ in Fig. 12, the tendency of which spring is to draw the carriage forward; and the forward end of the right-hand member $b$ of said carriage is provided with an upwardly-extending lug 17 as is shown in Fig. 13.

The carriage is actuated from a main shaft 26, which extends through from side to side of the casing about centrally between its ends, and is provided at its right-hand end with a crank handle 27, whereby the shaft is turned. This crank handle 27 has an extension $27^a$ which is carried down through a suitable opening preferably formed in the bottom of the casing adjacent to its inner right-hand face; and between said right-hand face of the casing and an apron 29 that extends from the bottom of the said casing, as is shown in Fig. 13.

A curved rack 30 is produced on the outer face of the apron 29, as is shown by dotted lines in Fig. 13, adapted to be engaged by a pawl 31 provided with a weight 32 and carried at the lower end of the extension $27^a$ from the handle 27. The said weighted pawl is adapted to insure the handle 27 being given its full movement to the rear of the machine during its operation in adding, as far as it is intended that it shall go, preventing the handle being brought forward again until the full rearward throw has been executed.

The direct movement is given to the carriage B through the medium of an arm 33 which is attached to the central portion of the shaft 26 and extends down through a longitudinal slot 34 produced in the bottom 10 of the casing about centrally between its sides as is shown in Fig. 5, and said arm 33 is connected by a link 35 with a downward projection 36 from the central portion of the rear member of said carriage B as is also shown in Fig. 5. Thus when the handle 27 is moved to the rear, which is the movement to effect an addition and the printing of an addition, the carriage B is moved forward and its spring 16 is placed under tension, and when the handle 27 is permitted to drop downward and forward the spring 16 returns the carriage to its rear or normal position.

Two or more type bars C, shown in detail in Fig. 10 are employed in connection with the machine. In the machine illustrated six of the said type bars are employed, each type bar being adapted to print the figures of one vertical line in a general column of figures of six digits each, for example, but it will be understood that any desired number of these type bars may be employed.

In the construction of a type bar an upper horizontal type-carrying arm 37 is employed, provided with a series of vertical pockets 38 extending through from top to bottom, each of which pockets contains a type 39. The faces of these type read from 0 the forward type to 9 inclusive, which appears on the rearmost type. These type are adapted to be thrown up by hammers to be hereinafter described, a hammer being provided for the type-carrying arm of each type bar. The type falls by gravity, assisted by a spring, and in order to limit the upward and downward movement of the type 39 each type is provided with upper and lower horizontal extensions 39ª, all pointing preferably in a rearward direction as shown in Fig. 10, the upper extensions in the normal position of the type resting upon the upper face of the type-carrying arm 37, and when a type is forced up its lower extension or projection will engage with the under face of the said type-carrying arm. It may be here remarked that a downwardly-extending pin 37ᵇ extends from the under face of the said arm 37 to the rear of the series of type 39.

The pockets 38 in which the type 39 have movement extend through one side of the type-carrying arm 37 as is shown in Fig. 11, so that the type may be readily introduced therein, and a strip 40ª is made to cross the open side portions of all of the pockets so as to hold the type in place as is also shown in Fig. 11. The type-carrying arm 37 is also provided at the rear of the type 39 with a series of notches 40 in its upper face, the notches being also ten in number, corresponding to the number of type 39. The type-carrying arms 37 are held in parallel order, one independent of the other and close to one another at a point centrally between the sides of the machine and adjacent to its longitudinal center as is best shown in Fig. 2.

Each type-carrying arm 37 is supported at its rear end by a standard 42; but the upper portions 41 of these standards are curved inward, or are suitably curved to provide for the position of the type-carrying arms 37 employed as stated; but the said standards 42 are spaced an equal distance apart at the bottom 10 of the casing as is particularly shown in Fig. 4. The standard section 42 of a type bar is provided with a foot 43 at its lower end, having a suitable notch 44 therein to receive one end of a spring 45; and the springs of all of the type bars employed are carried forward and are secured to the forward under face of the bottom 10 of the casing as is shown in Figs. 5 and 6. The foot sections 43 of the type bars C extend down through slots 47 produced in the rear portion of the bottom 10 of the casing, three slots being at each side of the central slot 34 heretofore mentioned; and it may be here remarked that a central slot 36ª is also produced in the bottom 10 of the casing for the passage of the downwardly-extending member 36 from the carriage B.

A horizontal rack arm 48 is secured to the standard member 42 of each type bar employed, and the rack arm 48 of a type bar extends forwardly a greater distance than does the type-carrying bar 37 and is provided with teeth 49 upon its under face. A support or brace 50 is provided for the rack arm 48, located at the rear of its teeth, and the said support 50 is secured at its lower end to a lower plain arm 52, parallel with the rack arm 48, which may be termed the horizontal body arm of the type bar; and a loop extension 51 is carried down from the brace or support 50 for the rack arm 48, and said loop extension 51 acts as a guide for a lower rack arm 53 parallel with and nearly of the same length as the upper rack arm 48. The teeth 54 of the lower rack arm 53, however, face upward. The lower rack arm 53 is adapted for end movement, the extent of this movement being that of one notch, as indicated by dotted lines in Fig. 10. Therefore the movable rack arm 53 is provided with a downwardly-extending heel member 55, having a rear extension 56 that is made to enter a recess 57 in the lower end 42ª of a standard 42, which lower end portion 42ª of the standard is thicker than the other portions thereof as clearly shown in Fig. 4. Thus the lower rack arm 53 is guided in its movement between its ends and at its rear end.

The standard member 42 of each type bar is provided with a friction roller 58 adjacent to its lower end, which rollers are adapted to travel on the upper face of the bottom 10 of the casing and render the movement of the type bars as smooth as possible. A spring 59 is secured to the lower end of the loop extension 51 from the brace or support 50 and to the lower portion of the lower rack arm 53 forward of its dotted position shown in Fig. 10. The lower or body arm 52 of a type bar C is provided with a forwardly-extending horizontal finger C', connected with and extending down from the forward portion of the body arm 52 preferably slightly to one side thereof as is shown in Fig. 11; and the said finger member C' of a type bar C is provided with three steps or recesses in its inner face at its forward or outer end, the inner step being designated as 60, the next outer step as 61 and the third step as 62. This latter step constitutes the forward extremity of the finger as is particularly shown in Fig. 11. The stepped portions of the fingers C' of the various type bars C employed extend under and operate in connection with a bank of keys at the forward end portion of the casing, to be hereinafter particularly referred to. The forward movement of a type bar C is limited by a stop 63 on its stepped finger member C' engaging with a preferably yielding barrier 64 which straddles the various finger members C' and is located on the bottom 10 of the casing to the rear of the key mechanism above referred to as is shown in Fig. 6.

In the construction of a finger member C' of a type bar C it is preferably provided with a recess $56^a$ at its lower portion, extending from its forward end to the said stop 63, so as to render the type bar thinnest at such point. The movable rack arm 53 of the type bar is normally held stationary and in its inner position shown by full lines in Fig. 10, the spring 59 being placed at such time under slight tension; and the means employed for the purpose consists of an arm 65 pivoted at its rear end 66 to the standard member 42 of the type bar. The arm 65 extends forward parallel with the upper portion of the body arm 52 of a type bar and is provided with a horizontal head 67, located within a recess 68 and adapted to normally enter a recess $67^a$ in the rack arm 53 above said recess 68, as is also shown in Fig. 10. The horizontal head 67 is held in frictional engagement with the under face of the sliding rack arm 53 by means of a spring 69 carried by the body arm 52 and engaging with the under face of the locking arm 65 as is also shown in Fig. 10. When the lower rack arm 53 is moved outward the locking arm 65 is pressed from engagement therewith, permitting the spring 59 to act.

The lower rack arm 53 of a type bar C is brought into action when the adding mechanism is operating to add and to print columns of figures. The upper rack 48 acts in conjunction with said adding mechanism only when a total is to be printed; and the lower rack arm 53 is moved outward to its dotted position when it is necessary to carry a number, carry tens, for example, in the adding operation.

The type bars C are moved back against the tension of their springs 45 by the rear straight portion 11 of the carriage engaging with the lower portion of the standard members of the said type bars as the carriage moves rearward; but while the carriage is assisted in its return movement by its spring 16, it is necessary to exert considerable force in order to overcome the resistance of the springs 45 connected with the side bars C. To that end I employ a mechanism best shown in Fig. 12 to act in connection with the projection 25 on the left-hand member b' of the carriage B. This mechanism consists of an arm 70, which is fulcrumed upon an upright 71 extending up from the bottom of the casing; and the said arm extends rearward through a suitable guide 72 and carries a roller 73 at its rear end, which roller in the movement of the carriage B travels along the inclined surfaces $25^b$ and $25^c$ and the straight intermediate top surface $25^a$, the arm being held down by means of springs 74 secured to the arm and to a frame 75 that extends below the under face of the bottom of the casing. As the carriage moves rearward, the roller traveling down the forward inclined surface $25^c$ of the said projection 25 will tend to quickly force or urge the carriage B in a rearward direction or to its normal position as shown in Fig. 12, thus greatly assisting the controlling spring of said carriage.

A compartment d is formed in the forward portion of the casing A, over which compartment a key mechanism D is located, as is best shown in Figs. 5, 6 and 14. The inner wall of this compartment d is the yielding barrier 64 against which the stops 63 on the type levers C strike when said type members reach the limit of their forward movement, as has been described, and bridge blocks 77 are located at intervals at the inner side of the barrier 64 as is best shown in Fig. 15. Trunnions 78 at the upper end portions of a series of stop leaves 76 are journaled in said blocks 77 and in the forward end wall of the casing, as is shown in Figs. 5 and 6. These levers occupy normally the downwardly-inclined position shown in Fig. 14, being held in such position by spring 79 located at their forward ends, and other springs 80, attached to their inner or rear ends, extend over the aforesaid blocks 77 and barrier 64, as is also shown in Figs. 5 and 6. One of these stop leaves 76 is provided for each type lever C employed; and normally the free longitudinal edge of a leaf at its rear end is immediately opposite the stepped end of a finger C' of each type lever C as is illustrated particularly in Fig. 14; and the said leaves prevent the type bars C from leaving their rear or normal position until the stop leaf in front of a particular type bar is pressed downward, and this movement is accomplished through the medium of a group of keys 83 forming a portion of the key mechanism above referred to.

Before describing the key mechanism in detail it may be here stated that a bar $81^a$ is held above the springs 80 at the inner ends of the stop leaves 76 as is shown in Figs. 5 and 6, which bar is provided with arms 81 that terminate in eyes, which eyes are mounted to turn on a shaft 82. The said bar $81^a$ is normally held from engagement with the springs 80 at the inner ends of the stop leaves 76 by means of one or more springs $82^a$, attached to the said bar and having bearing usually against the under face of the main shaft 26 as is shown in Fig. 13. When it is desired to carry all of the stop leaves from out of the path of all of the type levers, the said bar 81ª is pressed downward by means of a mechanism to be hereinafter described.

The main frame A of the machine is usually made to rest in a base frame A', being supported upon brackets $a$ contained in the base frame; but the base frame may be changed in character and the main frame may be otherwise supported.

What may be termed the frame or body of the key mechanism D consists of a lower plate 84, an intermediate plate 84ª and an upper plate 84ᵇ. The lower plate 84 is over the stop leaves 76 as is shown in Fig. 14, and is supported by suitable end bars $d^2$, the intermediate plate 84ª being supported by end bars $d'$, while the extreme upper plate 84ᵇ may simply rest upon the upper edge of the forward section of the main casing A as is also shown in Fig. 14.

In addition to the keys 83 which are brought into action when individual numbers are to be added, a repeating key 85 is also employed, and when said latter key is pressed downward the type last brought into action will be held for continuous printing and addition until the said repeating key is released. The main keys 83 are arranged in a number of longitudinal rows corresponding to the number of type bars C employed; and the main keys 83 are nine in each row, each row reading from 1 at the upper key to 9 at the lower key, since a cipher is always printed when none of said keys 83 is depressed. The keys 83 are also arranged in series of three in each row; that is to say, in one row the keys designated as 1, 2 and 3 would constitute one series; the keys designated as 4, 5 and 6 would constitute a second series and the keys designated as 7, 8 and 9 the third series, and these series correspond to the steps 60, 61 and 62 in the type bars C. The keys 83 are passed loosely through the plates 84, 84ª and 84ᵇ, and their lower ends are over the various stop leaves 76, but are held normally out of engagement therewith, one of the said stop leaves 76 being provided for each row of keys 83 as is shown by dotted lines in Fig. 15. Each key is limited in its upward movement by suitable shoulders 16ª produced in its shank 83ª, and each key 83 of a series or bank shown is provided with a notch 86 at the right-hand edge of its shank 83ª located between plates 84 and 84ª as is shown in Fig. 14. Each row of keys 83 is provided with a locking leaf 87, the said leaves being located opposite the notched edges of the said keys 83 as is also shown best in Fig. 14, their upper end portions being pivoted in the end supports $d'$ for the intermediate frame plate 84ª; and the lower portions of the locking leaves 87 are inclined inward and normally enter recesses 87ª below the notches 86. When a key is pressed down in a row, the leaf of that row will leave the recess 87ª in which it has normally entered and will enter the notch 86 of the depressed key, holding said key depressed; and as said key is depressed its lower end will carry downward the stop leaf 76 below it and will permit the type bar belonging to that especial row of keys to move forward for action. The various key-locking leaves 87 are held up to their work by springs 88, preferably having central bearing thereon.

If a key, for example, carrying the numeral 1 in the right-hand or unit row of keys 83 is pressed downward, the stop leaf 76 for that row of keys would be depressed and the right-hand or unit type bar C would move forward until the step 60 struck the lower projecting end of the depressed key, at which time the numeral 1 on type-carrying member of the acting type bar C would be presented beneath the inking ribbon, so that when the hammer mechanism operating on the type struck the type representing the numeral 1, it would effect a printing of the same on a continuous strip of paper or other material. If the key bearing the numeral 3 in the same or unit column was next pressed downward, the key 1 would be raised automatically in a manner to be hereinafter described, and then as the unit type bar moved forward it would continue its movement until the step 60 engaged with said key designated as 3, bringing the type carrying a corresponding number in position for an impression. If the key bearing the numeral 6 in the second set of the unit column is pressed downward, then the unit type bar would move forward until the step 61 engaged with the projecting end of the depressed key, bringing the type on the unit bar designated as 6 in position to be printed; and should the key bearing the numeral 9 at the extreme lower end of the unit column of the keys 83 be pressed downward, then the unit type bar would move forward until its forward end or step 62 engaged the projecting end of the depressed key, and the consequence would be that the type in the type-carrying arm 37 of the said type bar carrying the numeral 9 would be placed in position for printing. The operation with reference to the rows of keys 83 and their corresponding type bars throughout is the same as has been just described, it being understood that the first step 60 on a type bar C acts only upon the first set of three keys in the column belonging to that bar; the second step 61 acts exclusively upon the intermediate set or group of keys 83, while the last step 62, the one furthest forward acts only on the final or lower group or set of three keys. Thus while the numerals on the keys 83 read from the rear forward, 1, 2 3 to 9 inclusive, the type in the type arms 37 of the type bars C read from the front 0, 1, 2 to 9 at the rear. Thus it will be observed that the reading of the numerals on the bank of keys 83 is just the reverse of the reading of the type on the type bars C. Hence it will be readily understood that the operation above described with reference to the keys and the type bars is rapidly and accurately accomplished.

The arrangement of the keys 83 in the series of threes is best shown in Fig. 5, in which figure all of the keys are elevated or in normal position, whereas, in Fig. 6 one of the keys is shown depressed, that which would for example carry the numeral 5. The keys 83 are normally held in their upper or elevated position shown in Fig. 5, by springs 89, which are attached to the intermediate plate $84^a$ of the key-carrying frame, and to pins 90 which extend out preferably from the rear sides of the said keys at a point between the plates 84 and $84^a$.

Below the key-locking leaves 87 a shifting bar 91 is mounted to slide transversely of the machine upon the lower plate 84 of the key mechanism D as is shown in Figs. 14 and 15; and the said shifting bar 91 is provided with a series of upwardly-extending pins 92, which pins in the normal position of the shifting bar shown in Fig. 1, engage with the lower end portions of the aforesaid key-locking leaves 87, but should the shifting bar be moved to the right hand side of the machine the pins would carry the locking leaves 87 in the same direction, and thus remove any leaf that might be in the notch 86 of a key, taking it out therefrom and permitting the locked keys to be carried upward by their springs 89 to normal position. This action takes place at each extreme forward movement of the carriage B, the shifting bar being returned to normal position at the return movement of the said carriage. The shifting bar is held in normal position usually by a spring 93 that extends from the forward end of the casing into a slot produced about centrally in the shifting bar 91; and said shifting bar 91 can be moved at will to release any key that may have accidentally been held locked in lower position by operating a lever 94 that extends out through an opening $94^a$ in the forward end of the casing, the lever being suitably fulcrumed upon the said lower plate 84 of the key mechanism and having its inner end entered into a slot in the said shifting bar as is shown in Fig. 15.

If, however, it is desired to repeat any number or numbers expressed by the keys 83 previously pressed down, it is simply necessary to force down the repeating key 85 against the tension of a spring $85^a$ suitably secured in the casing, and having upward bearing against a pin $85^b$ secured to the shank of the said key 85 as is also particularly shown in Fig. 14. The lower end 95 of the key 85 is tapered and is bifurcated, and is made to enter a slot 96 at the left-hand end of the shifting bar 91; and the action of the said repeating key on the shifting bar when the key is pressed downward is to draw the shifting bar bodily in direction of the left-hand side of the machine and thus carry the pins 92 away from possible action on the key-locking leaves 87 and to also prevent the carriage B from acting upon said shifting bar, since as stated the carriage as it moves forward acts upon the shifting bar 91 to release all of the keys that have been pressed down; and on the return movement of the carriage the latter restores the shifting bar to its normal position. This action of the carriage is accomplished by horizontally mounting a trip bar 97 best shown at Fig. 13, at the inner right-hand side of the casing, suitable bearings 98 being provided therefor. This trip bar is provided with a downwardly-extending finger 99 at its rear edge, and with a downwardly-extending pin 100 adjacent to its forward edge; and said bar 97 between its ends has a horizontal diagonal projection 101, shown best in Fig. 15, which engages with the projection from an angular head 102 at the right hand end of the shifting bar. Therefore, when the carriage B reaches about the limit of its forward travel the lug 17 on the carriage engaging with the pin 100 on the trip bar 97 will force the said bar forward and thus draw the shifting bar 91 toward the right-hand side of the machine, causing the release of all the key-locking leaves 87 which may be in locking position; and at the return movement of the carriage the lug 17 by engagement with the finger 99 at the rear of the said trip bar 97 will carry the said trip bar rearward and restore the shifting bar 91 to its normal position.

With reference to the adding mechanism, an arm 103 is pivoted to the inner side of the main frame A adjacent to the forward end of the said frame, the pivot pins for the said arms being designated as 104. These arms are horizontal except at a point 106 between their ends, at which points the arms 103 are upwardly inclined as is shown in Figs. 12 and 13. The arms 103 extend rearward beyond the center of the said casing, and the rear ends of said arms 103 rest upon pins 107 secured to the sides of the casing, while at the inner or rear end of each arm 103 a narrower or finger section 108 is formed, and slightly at the rear of the inclined section 106 of each arm a bearing 109 is formed. These bearings 109 are adapted to carry the ends of a shaft 110, and on the said shaft 110 a series of disk wheels E are loosely mounted, said disk wheels being adding wheels; and each disk wheel at what may be termed its inner face is provided with a pinion 111 either attached thereto or integral therwith as is shown in Fig. 19, while a pin 112 extends adjacent to a tooth of the said pinion beyond the opposite side of the said disk as is shown in Fig. 20.

The periphery of each disk is provided with a series of recesses 113 dividing the said periphery into ten teeth at equal distances apart and of equal width, and each tooth is provided with a flange 115 at its outer edge at right angles to the body of the tooth as is also shown in Fig. 2. Upon the outer faces of these flanges the numerals are produced, reading 0, 1, 2, up to 9, inclusive.

The number of adding wheels E employed corresponds to the number of rack bars C; and the pinions 111 of the said adding disks or wheels E are adapted to be located between the opposing rack arms 48 and 53 of the rack bars C. In the adding operation the teeth of the pinions 111 engage with the teeth 54 of the lower rack arm 53, while in the operation of printing the total the teeth 49 of the fixed racks 48 engage with the said pinions, means being provided for lifting the carrying arms 103 for the said adding or calculating disks to bring about the above-mentioned result.

Forward of the shaft 110 for the adding or calculating disks E a shorter and independent shaft 116 is mounted to turn in bearings 116$^a$, supported from the bottom 10 of the casing. A lift arm 117 is secured to the left-hand end of the shaft 116, having bearing against the left-hand dogs 109 for said shaft 110, while a second arm 118, shown in Fig. 2, is carried from the right-hand end of the shaft 116, having bearing against the right-hand box for the disk shaft, whereby upon rocking the shaft 116 in one direction the carrying arms 113 for the calculating or adding disks E can be raised or lowered.

The left-hand lift arm 117 is provided with a forward extension 119, having an inwardly-extending pin 120; and adjacent to the forward end of the extension 119 from the lift arm 117 a horizontal flange 105 is produced upon the upper edge of the left-hand supporting arm 103, a corresponding flange being formed on the right-hand supporting arm. A stop bar 121 is movably mounted above all of the calculating or adding disks E, extending transversely of the main casing; and said bar is provided with downwardly-extending teeth so spaced that the teeth of the said stop bar can be made to enter transversely alining upper recesses 113 of all of the calculating or adding disks E to hold the said disks stationary when desired.

The spacing stop bar 121 is provided at each end with a downwardly-extending supporting arm 123 having a forward and downwardly extending extension 124 pivoted to the inner faces of the main casing at the right and left hand side at a point 125, which point is located between the pivot 104 for the supporting arms 103 and the boxes or bearings 109 for the disk shaft 110.

A spring 126 has bearing at the extension ends 124 of the supporting arms 123 for the said stop bar 121, serving to normally hold the same in engagement with pins 126$^a$ located at the sides of the casing as is shown in Fig. 12. When the stop bar 121 is in its normal position shown in said Fig. 12, its teeth 122 are held out of possible entrance in the spaces 113 at the margins of the disk wheels E, while the pinions 111 of said disks are in engagement with the teeth of the lower rack arms of the type bars C. But when the series of disks E are elevated by the elevation of their supporting arms 103, the stop bar 121 is simultaneously elevated, which is accomplished by the engagement of pins 122$^a$ extending from the under edges of the arms or extensions 124 of the stop bar with the flanges 105 at the upper edges of the supporting arms for the said disks E.

The shaft 116 carries a series of stop pawls 127 and a series of trip pawls 128. These pawls are in pairs, a trip pawl being placed close to each stop pawl. Each stop pawl is provided at that end which is mounted on the shaft 116 with a suitable eye 127$^a$, and each trip pawl 128 is likewise provided with an eye 128$^a$ at that end which is mounted on the shaft 116. The eyes of the trip pawls, however, are of greater diameter than the eyes for the stop pawls so that said trip pawls may have more latitude of movement on the shaft than the stop pawls, and the eyes of both the stop and the trip pawls are provided with longitudinal slots 129 in their forward faces, the slot in the eyes of the trip pawls being wider than that in the stop pawls.

The associated stop and trip pawls are spaced by suitable collars 130 as is shown in Fig. 2; and a key 131 is passed through the slots 129 of all of the pawls and through corresponding slots in all of the spacing sleeves, as is also shown in Fig. 2. Each stop pawl is provided with an upwardly extending tooth 132 at its free end and a weight 133 at the same end, which weights serve to normally hold the stop pawls in the lower position shown in Fig. 12, the outermost stop pawls being in engagement with stop lugs 134 carried by the casing.

The stop pawls correspond in number to the number of disks E, and the number of trip pawls corresponds to the number of type bars C employed less the unit bar, as said bar is not provided with the locking arm 65 heretofore mentioned. The pawls 127 and 128 extend rearwardly, and the stop pawls 127 occupy normally such a low position as not to interfere at that time with any of the mechanism of the machine.

Each trip pawl 128 is provided with a head 128$^b$, and the heads of the said trip pawls loosely engage and slide upon the locking arms 65 of the type bars C as is shown in Fig. 6; and when a disk has made a complete revolution the pin of that disk will engage with the trip pawl, operating on the locking arm 65 of the adjoining type bar to press the same and release the lower rack arm 53 of said type bar, causing it to slide out the distance of one tooth so as to move the adjoining disk E the distance of one tooth, thus carrying over the tens from one disk to the other in the operation of adding.

At the left-hand end of the shaft 116 a forwardly-extending curved arm 133$^a$ is secured to either a left-hand pawl 127 or 128; or to the left-hand spacing sleeve for the pawl, so that by pressing the arm 133$^a$ downward the stop pawls 127 will be raised while the trip pawls 128 will continue to travel on the locking arms 65; but this operation of raising the stop pawls is performed only when the pinions 111 of the disks E are raised to engage with the teeth of the upper rack arms 48 of the type bars C, which action takes place only when the total is to be printed, or the total amounts of a sum are to be repeated.

When an arm 133$^a$ is pressed downward it engages with the pin 120, thus pressing down the arm 119, rocking the shaft 116 and causing the arms 117 and 118 to lift up the series of disks E and at the same time carry from upper positions the stop pawls 127, and at the same time the stop bar 121 will be raised, but as the fulcra of the supporting arms 103 are further forward than the fulcra of the arms of the stop bar 121, the stop bar and the supporting arms 103, when the arm 133$^a$ is depressed, will travel upward at about the same speed for a certain distance, after which the stop bar will move upward quicker than the said supporting arms 103, so as to provide first at one period in the elevation of the disks E the locking of the said disks and secondly their automatic release from engagement with the locking bar; and this locking engagement of the disks as has been stated takes place while they are in transit between the parallel racks of the type bars C.

The arm 133$^a$ is pressed downward by means of what I term a total lever F, since this lever is brought into operation only when a total is to be printed. The lever F is substantially U-shaped, and at its forward lower portion is provided with a finger 139 that has bearing upon the arm 133$^a$ as is clearly shown in Fig. 12; and the rear vertical member 136 of the said lever F is fulcrumed on the left-hand inner wall of the casing A as is shown at 137, while a spring member 138 is downwardly and rearwardly carried from the lower portion of the said member 136 of said lever.

When a total is to be printed it is necessary that all of the type bars should be free to move forward to their full extent, since simultaneously with the printing of the total of the sum the ciphers on all of the disks will be in transverse alinement and visible from the front of the machine. To accomplish this result it is necessary that all of the stop leaves 76 should be depressed, and this is done by carrying an arm 76$^a$ upward and forward from the depressing bar 81$^a$, which acts upon the spring arm extensions 80 from the said stop leaves 76 as is shown in Fig. 12; and when the arm 133$^a$ has been pressed down a certain distance by the total lever F, the said arm 133$^a$ will engage with said arm 76$^a$ and cause the bar 81$^a$ to simultaneously depress all of the stop leaves 76 and carry them out of the path of all of the type bars C.

When a lower rack arm 53 of a type bar C has acted upon a calculating disk E to turn the same the proper distance, and before the type bar C turns to its normal position, the series of disks E should be raised to an intermediate position between the upper and lower racks 48 and 53 and at said time be locked from turning. This movement of the series of disks E is automatically accomplished at each movement of the carriage B through the medium of the pins 21 extending from the sides of the carriage. These pins act upon elevating dogs 139 pivoted below the carrying arms 103 for the said disks, being held in engagement with the lower edges of the said arms by springs 140 as is shown in Figs. 12 and 13. The dogs 139 are of angular construction and their horizontal upper portions that engage with the arms 103 extend in a rearward direction.

At the rear of the rear ends of the supporting arms 103 for the said disks E a locking bar 141 is vertically located in engagement with each inner side wall of the casing A. These locking bars 141 are provided with notches 142 in their forward edges between their centers and their lower ends; and their upper ends 143 are pivoted to the said casing while their lower ends extend downward a sufficient distance to be engaged by the aforesaid pins 21 of the carriage B as is shown in Fig. 12.

The locking bars 141 are pressed forwardly by springs 144 that bear against their rear edges. When the carriage B is in its normal or rearward position, the pins 21 will be in engagement with the lower forward edges of the locking bars 141 and will hold them perpendicularly against the tension of their springs 144. But when the carriage B moves forward to assist in an addition, the pins 21 leave the locking bars 141 and their springs 144 act to give said locking bars a downward and forward inclination; and when the carriage has reached the limit of its forward movement the pins 21 will have passed beneath the dogs 139 and will occupy a position immediately to the rear of them, which position is shown in Fig. 6. On the return of the carriage the pins 21 will rock the dogs 139 and will cause the supporting arms 103 for the disks E to be raised, clearing the teeth of the lower racks 53 of the type bars and the said arms will be raised a sufficient distance to cause their inner reduced ends 108 to enter the notches 142 in the spring-controlled locking bars 141, thus temporarily holding the disks and their supporting arms in elevated position.

Just about the time the carriage B reaches its rear or normal position, the pins 21 will have pushed the locking bars 141 rearward to their normal position and the supporting arms 103 will be released and the pinions of the disks E will be again brought into operative engagement with the teeth 54 of the lower racks 53.

It is desirable, and in fact necessary that the type in the type-carrying arms of the type bars should be in transverse alinement at the time of impression, so as to provide for a proper alinement in the column of figures being printed. I therefore provide an alinement device 145 adapted when the carriage B is at the limit of its forward stroke to enter transversely alining V-notches 40 in the type bars as is best shown in Figs. 2 and 6. This alinement bar 145 is carried at the rear ends of arms 146 fulcrumed between their ends on ears 147 that extend up from the sides of a box casing G in which the type-carrying arms of type bars have movement, and one of the arms 146, usually the left-hand arm, is pivotally connected to the upper end of a trip bar 148 that extends downward to a point in front of the inclined surface 18 of the said carriage B when the carriage is in normal position as is shown in Fig. 5, being provided with a roller 149 at its lower end, the roller being adapted to travel on the bottom 10 of the casing as is also shown in Fig. 5; but when the carriage B is at the limit of its forward stroke as is shown in Fig. 6, the roller 149 will have run up the inclined surface 18 of the carriage to a position on its rear member, thus causing the alining bar 145 to enter adjacent notches 40 to aline the same; but when the carriage is in its normal position shown in Fig. 5 the alining bar will be above and out of engagement with the type bars.

In addition to the mechanism shown particularly in Fig. 12 for assisting a carriage B on its return movement, the mechanism shown in Fig. 13 is also employed, which was partially described in the general description of the carriage, namely, that portion of the carriage containing the cam 22, to accomplish the above named purpose. To that end an angle arm 150 is pivoted at its forward end on the apron 29, and the forwardly downwardly-extending member of this arm carries a friction roller 153, which is adapted to travel around the aforesaid cam 22. A second arm 154 is pivoted alongside the arm 150 but is of much greater length, and the forward ends of both of said arms are pivoted upon a projection 151 from the bottom of the casing. The downwardly-extending rearward portion of the arm 150 is provided with a recess in that face which is opposite the arm 154, adapted for engagement by said arm; and the arm 154 at its rear end is made to engage with a bridge bar 155 secured to the aforesaid bottom 10 of the casing. A spring 157 is secured to the forward upper portion of the arm 150 and extends over and to an engagement with the upper portion of the arm 154, which spring 157 tends to hold the arm 150 in normal position after it has operated upon the cam 22. Springs 158 are attached to the arm 154 and to an extension frame 159 from the bottom 10 of the casing of the machine. In the operation of this portion of the device when the carriage is moved forward the roller 153 will travel in engagement with the lower edge of the cam 22; and at the initial rearward movement of the carriage it will travel up the inclined portion $22^b$ of the cam, placing the springs 158 under tension; as the carriage approaches its rearward position the roller 153 traveling down the forward inclined surface $22^c$ of the cam tends to assist the carriage in its rearward movement.

With reference to the printing mechanism, particularly that portion of it which forces the type upward to an impression upon the slip prepared to receive it, a cross bar 160 is secured to the sides of the casing above the stop bar 121. The cross bar 160 is more or less upwardly and forwardly inclined as is shown in Fig. 7, and at its center is provided with an upwardly extending portion 161 that practically corresponds in width and position to the combined width and position of the type-carrying arms 37 of the type bars C at their forward ends. This central projecting portion 161 of the bar 160, which may be termed a bridge bar, carries a number of rearwardly-extending set screws 162, corresponding in number and in relative position to the number and position of the type-carrying arms 37 above referred to, as is shown in Fig. 2.

At each side of the center of the rear face of the bridge bar 160 upwardly and rearwardly-extending lugs 163 are provided, which lugs support a bar 164 that is parallel with and is practically of equal length with the widened portion 161 of the bridge bar. The rod 164 is adapted to carry springs 165, corresponding in number to the number of type-carrying bars C; and each spring 165 is provided with an upwardly and forwardly-extending section 166, adapted for engagement with one of the said screws 162, to increase or decrease the tension of the spring against which the screw may act. Also at each side of the center of the rear face of the bridge bar 160, upwardly and rearwardly-curved arms 167 are secured in any approved manner, connected at their upper ends by what may be termed a contact bar 168, the upper surface of which is usually rounded off. The upper ends of the main portions of the springs 165 have bearings upon a rod 169. A sleeve 170 is loosely mounted on the right-hand end of the shaft 169, and on this sleeve a wheel 171 is secured, which may be a segment of a circle, and the said wheel is peripherally grooved to receive the upper end portion of a chain 172 which is secured to the forward peripheral face of the wheel 171; and the said chain extends down and is passed under and in engagement with a wheel 173 which is secured to the left-hand end of the main shaft 26, or that which is operated by the handle 27, so that in the movement of the handle 27 the sleeve 170 and the wheel 171 are given a partial revolution backward or forward according to the direction in which the said handle is moved.

A series of hammers 173 is loosely mounted on the central portion of the rod 170, one of said hammers being provided for each of the type-carrying arms 37 of the type bars C, being adapted to strike the under faces of the type 39 carried by said arms 37 as is shown in Fig. 7. Each hammer 173 is provided with an opening 174 at its forward portion, or that portion which is forward of the shaft 169 as is also shown in Fig. 7, in order to permit the upper ends of the springs 165 to normally bear against the said shaft 169; but furthermore each hammer 173 at that portion which is below the shaft and which is at the lower portion of the opening 174 is provided with a lip 175, which is more or less downwardly and rearwardly curved as is shown in Fig. 7; and the springs 165 have bearing also against the forward convexed edges of the lips 175 of the hammers 173, so that when the head portions of the hammers are depressed their controlling springs are placed under tension and when all the depressed hammers are released from pressure their springs 165 immediately force them up to an engagement with the type beneath which they may be located. The type acted upon, it may be here stated, is always the type occupying the position of the forward type of the type bars when all the type bars are in their normal or rear positions.

Each hammer 173 is provided with a head 176 at the upper portion of its rear end, which hammer engages with the type. The rear end of each hammer is wider than the other portions of its body, since the under face 187 of each hammer is inclined downward and rearward as is also shown in Fig. 7; and in the rear end of each hammer a recess 177 is provided, preferably of dove-tail formation.

A controlling mechanism H is provided for the series of hammers 173, being adapted to operate them to a position removed from the type they are to strike, and also adapted to release the hammers when in their lower position and permit their springs 165 to force them upward to engagement with the type to produce an impression.

The hammer-controlling mechanism is preferably as follows: A rearwardly-extending arm 178 is secured to the inner end of the sleeve 170 on the shaft 169, upon which sleeve the sector or segment wheel 171 is secured. This arm practically engages with the right-hand hammer, a suitable collar 177$^a$ being secured on the fixed shaft 169 adjacent to the left-hand hammer, and therefore the hammers are pivotally mounted on the shaft 169 between the arm 178 and the collar 177$^a$ as is illustrated in Fig. 2. The arm 178 is an angular arm and the rear member 179 thereof is parallel with the shaft 169 and extends from the main arm 178 in direction of the left-hand side of the machine. The extension 179 from the arm 178 is provided with a longitudinal channel or groove 180, and in this channel or groove a series of hammer-depressing devices 181 are pivoted, preferably by means of a pivot pin 182. Each of the hammer depressing devices comprises an upwardly-extending body portion 181 having a spur 183 at the rear upper edge, and a substantially dove-tail shaped nose 184 at the forward edge, and the noses of the said hammer-depressing devices are adapted to enter the recesses 177 in the hammers 173, a hammer-depressing device being located immediately to the rear of each hammer 173.

The body portion of each hammer depressing device is provided with a forwardly-extending member or arm 186 that normally engages with the under edge 187 of the hammer in connection with which the depressing device is employed as is shown in Fig. 7. When the body portion of a hammer depressing device is forced forward and the nose 184 enters the recess 177 of a hammer 173 in connection with which the depressing device is employed, and the handle 27 is carried rearward to force the carriage B forward, the hammer-depressing mechanism is carried downward and takes with it only the hammer engaged, which is the hammer corresponding to the type bar moved forward by the carriage. The hammer-depressing mechanism continues to take the engaged hammer or hammers downward until the arm 186 of the body member 181 of the depressing device in action strikes the contact bar 168; and since the arm 168 of the engaged body member 181 upon engagement of said body member is carried slightly away from the hammer 173 to which it belongs, when such arm struck said contact bar 168 the arm was pressed upward and the body member 181 of the depressing device is disengaged from the hammer with which it was in engagement and the hammer is then forced up by its spring 165 to an engagement with the type to force the same to an impression. Upon the return or forward movement of the handle 27 the hammer-depressing mechanism H is restored to its normal position and is again ready for action.

Each hammer-depressing device or body member 181 of the depressing mechanism H is provided with a shoulder 185, which in the normal position of said body member or device 181 engages with the upper portion of the extension arm 179 of the main or carrying arm 178 of said hammer-controlling mechanism, so that the said body portions 181 are limited with reference to their rearward movement; and the arm sections 186 projecting from the body portions 181 are normally held in engagement with the under edges of the hammers 173 by a spring 188 which is attached to the wheel 171 or its hub and to the bridge bar 160, the said spring acting to turn the sleeve 170 forwardly and thus normally maintain the said hammer-depressing mechanism in the upper position shown in Fig. 7 and in Fig. 5. In Fig. 6 the hammer-depressing mechanism is shown in its lower position or the position to which it was carried upon the forward movement of the carriage, being restored to its normal position shown in Fig. 5 upon the return movement of said carriage.

To avoid confusion the parts 181 and accompanying arms 186 may be termed hammer-controlling devices as distinguished from the hammer-depressing mechanism H as a whole. The mechanism whereby individual depressing devices are brought into action is as follows: The casing G heretofore referred to and in which the type-carrying arms 37 of the type bars C have movement, is immediately opposite and adjacent to the series of hammer-controlling devices 181, and is held horizontally in the frame by means of a suitable supporting bar 191$^a$. This casing G is open at the top and at each end, and its bottom is made deeper at the rear than at the center or forward portion in order to provide for a recess 189 that extends to the rear as is shown in Fig. 7. A series of tumblers K has longitudinal sliding movement in the said casing upon the bottom thereof, one tumbler below each type-carrying arm of each type bar C. The forward ends of the tumblers move between the bottom of the casing and a cross bar 190 above said bottom, but the bottom is cut away at a point back of the forward end of the said casing G, as is shown in Fig. 7. Each tumbler K consists of a head section 192 that slides between the bottom of the casing and the forward partition 190, a heel section $k$ and a narrow connecting body section 193. Each heel section $k$ consists of an upwardly-extending rear member 191 engaged by one of the pins 37$^b$ extending down from a type-carrying member 37 of a type bar as is shown by dotted lines in Fig. 7, and a bottom portion 192$^a$ that moves in the recess 189 in the casing G and limits the forward movement of the tumbler of which it forms a part; and each tumbler has a spring 194 attached to its heel section $k$ and to the bottom of the casing G, the springs 194 tending to draw the tumblers forward to striking engagement with the hammer-controlling devices 181. But the tumblers are held back in their normal position as long as their controlling type-carrying bars maintain their normal position; however, the moment a type-carrying bar is moved forward or brought into action the accompanying tumbler is drawn forward by its spring 194 and the hammer-controlling device 184 acted upon by such forwardly-moving tumbler is brought into interlocking engagement with the proper hammer 173 to be carried down and released for printing purposes in the manner that has been described.

Each tumbler K at its forward or head portion 192 is provided with a plate 195, the plate for the right-hand tumbler or that which is attached to the tumbler below the unit type-carrying arm 37 being the shortest and the plate at the left-hand side tumbler being the longest, the plates being stepped; that is to say, the plate 195 of the right-hand or units tumbler, for example, is just the width of said tumbler, while the plate of the next or tens tumbler extends over the plate of the units tumbler, and the plate of the hundreds tumbler extends over the plates of the tens and the units tumblers, and so on, the plate 195 of the last or left-hand tumbler extending over the plates of all of the tumblers; so that if the units and hundreds type-carrying bars are operated together, the hundreds, tens and units tumblers will be brought into action; and if the tens type-carrying bar is brought into action the hammer depressing devices corresponding to the tens and hundreds hammers will be operated upon; but if the units or right-hand tumbler only is operated, then only the hammer-depressing device operating upon the units hammer will be brought into action, whereas, if the tumbler at the extreme left-hand side is brought into action it will act upon all of the hammer-depressing devices 181 of the hammer-controlling mechanism H.

An independent plate 196, lower than all of the other plates, is mounted to slide beneath the units or right hand tumbler and the plate carried thereby; and the said auxiliary plate 196, which may be termed a striking plate, extends out beyond the right-hand side of the casing G. This plate is brought into action only when the total lever is pressed down, and is intended to print a cipher in red color at the top of the column, to show that the machine was in order when the counting was commenced; and in printing a total, even though the total should terminate in any other figure than a cipher, the auxiliary plate would still act, but the position of the units carrying bar would determine the figure which would be the terminal figure in the total.

The auxiliary plate 196 is held in normal position or flush with the forward ends of the tumblers by a spring 197 suitably secured to the right-hand side of the casing G, the lower end of the spring having bearing against a bar 198 or its equivalent secured to said auxiliary plate 196 and mounted for sliding movement on the supporting bar 191ª; and the saideauxiliary plate 196 is brought into action by the rearward movement of the carrying mechanism for the inking ribbon M, which ribbon is in two longitudinal divisions, the forward division m of red color and the rear division m' of black. In the rear adjustment of the carrying means for the inking mechanism, the red section of the ribbon is brought over the type from which the impression is to be taken, since the totals are printed in red, but when the total lever is in its upper or normal position, the black section of the ribbon is over the type that are to make the impression; but as stated the red section of the ribbon is brought over the type at the commencement of the addition, and at that time the auxiliary plate 196 acts upon a units hammer-depressing device to print a cipher in red color.

With reference to the mechanism for feeding and carrying the inking ribbon and for adjusting the same so as to bring one or the other of its sections over the type to be printed, such mechanism is as follows: A shaft 199 is journaled in the sides of the main casing A below the shaft 169 as is shown in Figs. 5, 6, 12 and 13; and within the said casing at each end of the said shaft 199 an arm 200 extends downward, being attached to the shaft. A bar 201 is mounted to slide in openings 202 in the sides of the main casing A at the rear of the arms 200, the openings 202 being practically opposite the central portions of the arms 200 as is particularly shown in Figs. 12 and 13. A spring 203 is secured to the hub section of each arm 200, said springs being carried downward and rearward and attached to the bar 201 which has sliding movement in the said openings 202; but instead of employing openings for the bar 201 to slide in, channel offsets may be provided at the inner faces of the side portions of the said main casing. One of the arms 200, namely, the left-hand arm, is in engagement with the offset 138 from the rear member 136 of the total lever F heretofore described; so that when the total lever F is pressed downward the arms 200 are carried rearward, placing the springs 203 under tension. The arms 200 combined with the sliding bar 201 support a frame F' which is the foundation frame for the mechanism controlling the ribbon M. The frame F' consists of bottom bars 204, one at each side of the machine being connected with the lower ends of the aforesaid arms 200, and carried upward to an engagement with the said sliding bar 201; and the said lower members 204 of the frame F' rest and have sliding movement upon pins 205 or their equivalents extending inwardly from the sides of the main casing A.

The frames F' are completed by the addition of upper members 206, which are also secured to the sliding bar 201; but the said upper members are carried horizontally forward through the space intervening between the shaft 169 and the shaft 199. The upper horizontal portion of each carrying frame F' is adapted to support a ribbon guide frame. These ribbon guide frames are of like construction and each consists of a bottom member 207, which members 207 are diagonally secured upon the upper portions of the upper members 206 of the aforesaid supporting frames F', the position of the said bottom members of the ribbon guide frames being such that the said members incline from the sides of the machine forwardly in direction of the center of said frame, one of said guide frames being located at each side of the forward end portions of the type bars C when said bars are in their normal position. The ribbon guide frames further consist of uprights 208 and 209, the uprights 208 being the forward uprights and the uprights 209 the rear uprights, as is shown in Fig. 12 and as indicated in Fig. 2. The uprights 208 and 209 are connected preferably by cylindrical bars 210, and from said bars 210 horizontal plates 211 are carried transversely of the machine in direction of the type carrying bars, as is shown in Fig. 2; and the ribbon M is passed from beneath the connecting bars 210 upward over the plates 211, which are practically tables and will be so denominated, and across the forward end portions of the type bars C when in their normal position, the ribbon therefore occupying a position above the hammers 173.

In order that the ribbon shall be held as closely and as smoothly as possible relatively to the type bars C, yokes 212 are passed over the ribbon and loosely down through the tables 211; and each yoke 212 is provided with a weight 213, so that while the yokes 212 act to hold the ribbon down to its work they do not offer material resistance to the shifting of the ribbon across the line of type in the type bars.

The ribbon M is carried rearward at each side of the main casing A over guide spools 213ª, which may be made to rotate or may be stationarily secured to the casing; and from the guide spools 213ª the ribbon is carried to winding spools 214, one of which is mounted to revolve on suitable bearings at each side of the main casing adjacent to its rear end; and each winding spool 214 at its outer end is provided with an attached ratchet wheel 215. These winding spools are preferably tensionally controlled upon their supports.

Above the guide spools 213ª and the winding spools 214, controlling arms 216 are located, one of said arms being pivotally attached at its forward end at the rear of the winding spool over which it is placed, to the inner side faces of the main casing A; and the said controlling arms extend rearward beyond and over the winding spools 214, and their outer ends 217 are horizontal for a purpose to be shortly described. Near the outer end portion of each controlling arm 216 the upper end of a spring 218 is secured, the lower ends of the springs being pivotally attached to the inner side faces of the casing A, so that when the controlling arms 216 are raised the springs 218 are placed under tension.

A shaft 219 is passed transversely through the sides of the casing at the rear and immediately under the ends 217 of the controlling arms 216, which shaft 219 is the controlling shaft for the controlling arms and is manually operated by means of a knob 219ª preferably located at its right-hand end as shown in Fig. 2. This controlling shaft 219 is provided within the casing at each end with flattened upper and lower opposing recesses 220, the recesses 220 at one end of the shaft being at right angles to those at the opposing end of the shaft.

A trip lever 221 is located at each side of the casing at its inner face at the rear of said casing, occupying a vertical position therein; and each trip lever 221 is pivoted between its upper end and its center as is shown at 222 in the drawings; and each of the said trip levers is normally forced inward by means of springs 223 having bearing against their outer edges, the springs being suitably secured within the said casing. The springs 223 are by preference bow springs, and the inward movement of the trip levers 221 is limited by stops 224 extending from the inner side faces of the casing A.

At the upper end of each trip lever 221 a dog 225 is secured, each dog being adapted for engagement with a ratchet wheel 215 forming a portion of a winding spool 214. Each dog 225 is provided with a pin 227 that extends inwardly over the adjacent controlling arm 216; and it may be here remarked that the outer end portions 217 of the said controlling arms 216 rest upon the recessed portions 220 of the shaft 219. Thus if the shaft 219 is given a portion of a revolution one of the controlling arms 216 will be elevated and the other one depressed, and the depressed arm 216 will permit the accompanying dog 225 to engage with the ratchet wheel of the winding spool below it, while the elevated controlling arm 216 will carry its accompanying dog from engagement with the ratchet wheel of the winding spool in connection with which it is employed, and in this manner the ribbon may be made to travel from one winding spool to the other, since the ends of the ribbon are secured to the winding spools, the ribbon being fed to the spool with which the dog 225 engages, the opposing winding spool being free, having been relieved from engagement with its accompanying dog.

The feed of the ribbon is accomplished by the movement of the carriage B and through the direct instrumentality of the rollers 13 at the rear of the carriage which as stated serve also to render the movement of the carriage easy. When the carriage B is moved forward, the springs 223 presses the lower ends of the trip levers 221 forward at their lower portions, thus carrying their upper ends rearward and dragging the dogs 225 in the same direction over the teeth of the ratchet wheels 215 with which they may be in engagement; and when the carriage B is returned to its rear or normal position, the trip levers 221 are restored to their normal position and the dogs carried thereby being forced forward will turn the ratchet wheels 215 with which they engage one tooth in a forward direction, thus feeding the ribbon from one winding spool to the other a sufficient distance to change its position relatively to the type or the type-carrying bars. The left-hand trip lever 221 operates to control the delivery mechanism N located on the top of the outer casing A² that surrounds or incloses the main casing A. This controlling means consists of a member 229 that is carried downward from a slide 230, which slide is mounted for forward and rearward movement upon the upper edge of the left-hand side of the main casing, being held in place by suitable guides 231 and 232, and in the downwardly-extending member 239 from the said slide a recess is formed, which recess receives a spur 228 that extends up from the upper end of the left-hand trip lever 221; therefore when the trip levers 221 are permitted to move forward, the slide 230 is moved rearward, and when said trip levers 221 are moved rearward or to their normal position, the slide 230 is given a forward movement. This slide 230 carries a pivoted dog 233 at its forward end, and said dog engages with a ratchet wheel 234, which ratchet wheel 234 is mounted to revolve upon a plate 235 pivotally attached to the left-hand outer face of the main casing A as is shown at 237 in Fig. 2, the said plate being made to cross the opening 236 in the aforesaid left-hand side of the main casing adjacent to the front; and the ratchet wheel 233 is located where this opening 236 occurs. The ratchet wheel 234 is prevented from moving in the wrong direction by means of a dog 236ª controlled by a suitable spring 236ᵇ, and at the forward end of the pivoted plate 235 a horizontal extension 238 is provided, and in said extension a set screw 239 is located, having bearing upon the upper edge of the left-hand side of the casing at its forward end, so that by adjusting the set screw 239 the ratchet wheel 233 may be raised or lowered as occasion may demand.

It has heretofore been stated that when the ribbon-carrying mechanism was moved to the rear the auxiliary striking plate 196 was brought into action. Such action is brought about in the following manner: and as is illustrated in Figs. 2 and 8, wherein it will be seen that a lever 240 is pivoted upon the right-hand portion of the support 191ª for the casing G in which the upper members 37 of the type bars operate. This lever at its inner end is provided with a finger or a point 241 that enters a recess 242 in the outer edge of the bar 198 connected with the said auxiliary striking plate 196. The lever 140 at its outer end is attached to a leaf spring 243, and the said leaf spring in its turn enters a recess in an arm 244 that extends rearward from the rear upright 209 of the right-hand ribbon guide frame, so that as the carriage for the ribbon is moved to the rear the aforesaid auxiliary striking plate 196 is carried outward and causes the hammer 173 for the units type bar C to act upon the cipher type in said bar and produce an impression in red, provided the said units type bar is in normal position at such time.

An opening 245 is made in the outer casing A at its top portion over the type-carrying portion of the type bars C, and said top portion of the outer casing A carries the impression mechanism N. This impression mechanism may be described as follows and as shown in Figs. 1 and 5. The mechanism consists of a frame comprising side pieces 246, the left-hand side piece being provided with a forwardly-extending finger piece 247; and said frame has a hinge connection 248ª with the said top portion of the outer casing A to the rear of the opening 245 therein. A shaft 248, which may be a tubular shaft in the interest of lightness, is journaled in the side pieces 246 in the said frame, and the said shaft is provided at its central portion with an impression roller 249 that extends down through the opening 245 over the upper faces of the type in the type bars C. This roller when the frame is in its lower or working position shown in Figs. 1 and 5, is operated by the ratchet wheel 234 lately described, engaging with a wheel 250 near the left-hand end of the said shaft 248, which wheel 250 is made of leather, rubber, or their equivalent, and the shaft 248 is turned each time that the ratchet wheel 234 is moved.

At the left-hand end of the shaft 248 a knob 251 is provided, whereby said shaft may be turned by hand when desired, and at the right-hand end portion of the shaft 248 a rubber disk 252 is provided, whereby the shaft 248 may be turned from the right-hand end of the machine. A guide frame is provided for the impression roller 248, having a hinge connection with the rear portion of the main frame carrying said impression roller. This guide frame consists of guide pieces 252ª which are more or less curved to adapt themselves to the curvature of the impression roller, and are connected at the top by a bar 253 carrying a smoothing roller 254; and the said guide frame is further connected by a central rod or shaft 255 carrying another roller 256; and the side members of the guide frame are also connected by a rod 257 carrying a roller 258. The paper 259 to be printed upon is drawn from a reel 260 at the rear end of the top portion of the outer casing A², supported by suitable standards 261, and said paper passes from the reel beneath and in engagement with a cylindrical guide 262 and is then passed over the lower roller 258 of the guide frame around the impression roller and out between the upper and the intermediate rollers 254 and 256 of said guide frame. The guide frame is also provided with a blade 262ª over which the paper may be drawn when it is desired to sever the printed portion thereof.

It may be desirable to print numbers by the machine without adding them; this is accomplished by securing one end of a spring 263 to the inner face of the left-hand side of the outer casing A², and attaching a knob 264 to the free end of said spring 263 and providing the free end of the spring with a pin 265, which spring and pin when in normal position do not interfere with the mechanism within the main frame A; but when it is desired to print without adding, the knob 264 is pressed inward, which will carry the pin through an opening in the left-hand side of the inner casing A to a point above the supporting arms 103 for the calculating disks E and will prevent said disks when the total lever F is pressed downward, from passing up further than an intermediate position between the upper and the lower racks of the type bars. Under these circumstances, while the keys and the crank handle of the machine are operated it is necessary that said total lever F be held down and the said pin 265 held pressed inward, which can be readily done by the thumb and the fingers of the left hand of the operator.

The operation and functions of the several parts of the machine have been fully stated in connection with the detail description of such parts, and therefore the general operation of the machine may be briefly stated as follows: The carriage B is the main operative factor in the machine outside of the main shaft and its accompanying crank handle. The parts being in their normal position, the keys 83 representing the figures to be added are pressed downward, which carries the corresponding stop leaves out of the path of corresponding type bars, or the type bars that it is necessary to bring into action to effect the addition. Then the crank handle is carried to the rear, whereupon the type bars corresponding to the depressed keys move forward until they are stopped by the lower portions of said keys, thus providing for the proper revolution of the proper calculating disks E and the presentation of the necessary figures in the lines of type at the point where the impression is to be made. As the handle is moved fully to the rear and the type bars in action have reached the limit of their forward movement, the carrying mechanism for the hammers is released from the latter and said hammers move upward to strike the type from which the impression is to be obtained. At this time the black section of the inking ribbon is over the type. The required hammers were engaged by their depressing devices at the commencement of the rearward movement of the handle and were released at about the time the handle reached the limit of its rearward movement. At the return movement of the handle the disks are bodily lifted so as to take their controlling pinions out from engagement with the lower racks of the type bars C, and the said disks are held between the upper and lower racks of the type bars during the forward movement of the handle and the rearward movement of the carriage, until at about the limit of such movements the disks are again permitted to drop to bring their controlling pinions in engagement with the lower racks of the type bars for another addition. The operation is thus continued and at each addition the figures that were added are printed in column form, one sum below the other, and the total is added by the disks in the manner described.

The total is readable on the disks at any time through suitable openings in the outer casing $A^2$; but when it is desired to print the total, the total lever F is pressed downward, which will bring the pinions of the disks E in engagement with the teeth of the upper rack arms of the type bars C, and said depression of the total lever will likewise cause the red portion of the ribbon to be brought between the type and the impression roller. The total lever F being held down the handle is carried rearward as before, turning all of the disks and making each of them show a cipher where they before displayed the total; and since all of the stop leaves were pressed down by the total lever, all of the type bars C are free to move forward and do so, and the total is then printed in red in proper place. The total lever F is then released and the handle moved forward, which will bring all of the parts to normal position and show a line of ciphers at the sight openings for the disks. Before an adding, however, in order to test the machine and show that it is in working order, the auxiliary slide is brought into action in the manner heretofore described.

The keyboard D is practically of a self-releasing form, in that when a key in any row is pressed down should another key in the same row be struck such action will release the one first pressed, since the key last pressed acts upon the locking leaf 87 of that row of keys.

In multiplying, the keys representing the multiplicand are depressed and the disks E are raised to their intermediate position, which action presents the red portion $m$ of the inking ribbon M over the type to be struck. The handle 27 is then operated to print the figures. The keys bearing the figures of the multiplier are now depressed and the machine is operated to print said multiplier. The calculating disks E are now brought down to be operated upon by the lower racks of the type bars C and the paper carrying mechanism N is carried back out of the way, and the keys bearing the figures of the multiplicand are again pressed in addition to the repeating key 85. If the multiplier is 4 for example, the handle 27 is operated four times and then the operation of printing the total is performed.

It may be here remarked that the arm 148 for the alinement bar 145 is prevented from moving too far forward by pivoting thereto a horizontal link 266 and pivoting said link to a post 267 at the rear of the machine.

Having thus described my invention, I claim as new, and desire to secure by Letters Patent,—

1. In a calculating machine, a keyboard provided with a series of spring-controlled keys arranged in series, each series of keys being arranged in groups, tension-controlled type bars limited in movement in one direction by the depressed keys of the keyboard, a calculating mechanism operated by the movement of the type bars, a carriage, means for controlling the movements of the type bars by the movement of the carriage, and a printing mechanism operated partially by the movement of the type bars and partially by the movement of the carriage.

2. In a calculating machine, a key-board, tension-controlled depressible keys carried by the said board, a stop leaf below each key and locking means for the keys, a releasing device for the locking means, type bars mounted to slide relatively to the said stop leaves, being limited in their movement in one direction first by the stop leaves and second by the key or keys that are depressed, a calculating mechanism operated by the type bars, a carriage controlling the movement of the type bars in one direction, and means for operating the releasing device for the keys by the movement of the said carriage.

3. In a calculating machine, a casing, a key-board mounted therein, tension-controlled depressible keys mounted in said board and arranged in rows, a locking device for the keys of each row, a releasing device common to the locking devices for all the rows of keys, a spring-controlled stop leaf pivotally mounted beneath all the keys of each row, type bars slidably mounted in the casing, having spring-controlled movement in direction of the stop leaves and the lower ends of the keys, the number of type bars corresponding to the number of rows, a carriage for operating the type bars against the tension of their controlling springs, a trip connection between the carriage and the releasing device, a calculating mechanism operated by the said type bars, and a printing mechanism operated through the movement of the said carriage.

4. In a calculating machine, a casing, a key-board mounted therein, tension-controlled compressible keys mounted in said key-board and arranged in rows, a locking device for the keys of each row, a releasing device common to the locking devices for all the rows of keys, a spring-controlled stop leaf pivotally mounted beneath all the keys of each row, type bars slidably mounted in the casing, having spring-controlled movement in direction of the stop leaves and the lower ends of the keys, the number of type bars corresponding to the number of rows, a carriage for operating the type bars against the tension of their controlling springs, a trip connection between the carriage and the releasing device, a calculating mechanism operated by the said type bars, a printing mechanism operated through the movement of the said carriage, and means for carrying the calculating mechanism from an adding position to a total-designating position.

5. In a calculating machine, a series of type-carrying arms arranged in parallelism, tension-controlled type loosely mounted in said arms, a carriage movable relatively to the faces of the type in the said type-carrying arms, a multi-colored ribbon supported by the carriage, means for shifting the carriage to bring a desired color of ribbon over the type to produce an impression, supports for the type-carrying arms, means for operating the said supports, a calculating mechanism operated by the movement of the said supports, and a paper-carrying mechanism adjustably mounted over the type-carrying arms.

6. In a calculating machine, a series of type-carrying arms arranged in parallelism, tension-controlled type loosely mounted in the said arms, a carriage movable relatively to the faces of the type in said type-carrying arms, a multi-colored ribbon supported by the carriage, means for shifting the carriage to bring the desired color of ribbon over the type that is to produce an impression, supports for the type-carrying arms, means for operating said supports, a calculating mechanism operated by the movement of the said supports, a paper-carrying mechanism adjustably mounted over the type-carrying arms, a carriage adapted to act upon the said supports, and means for automatically and independently feeding the inking ribbon and the paper by the movement of the said carriage.

7. In a calculating machine, a casing, a key-board having compressible keys, type bars mounted to slide in the casing relatively to the said keys, said type bars being provided with stepped members for engagement with the keys, each type bar comprising an upper type-carrying arm and opposing rack arms beneath the type-carrying arm, an adjustable shaft, calculating disks loosely mounted thereon, a pinion secured to each disk, adapted for engagement with either the upper or the lower racks of the type bar, means for communicating motion from one disk to the other, and means for imparting individual movement to the type bars.

8. In a calculating machine, a casing, a key-board having compressible keys, type bars mounted to slide in the casing relatively to the said keys, said type bars being provided with stepped members for engagement with the keys, each type bar comprising an upper type-carrying arm and opposing rack arms beneath the type-carrying arm, an adjustable shaft, calculating disks loosely mounted thereon, a pinion secured to each disk, adapted for engagement with either the upper or the lower racks of the type bar, means for communicating motion from one disk to the other, means for imparting individual movement to the type bars, and devices for carrying the pinions of the disks to an engagement with either the upper or the lower racks of the type bars.

9. In a calculating machine, a carriage, a series of depressible keys, means for operating the carriage, type bars movable to and from the keys, which type bars are limited in their movement in one direction by the keys, and are controlled in both directions by the movement of the carriage, an adding mechanism controlled by the movement of the type bars, and a printing and a paper feed mechanism also controlled by the movement of the carriage.

10. In a calculating machine, a casing, spring-controlled compressible keys, devices for holding the keys down, devices for releasing the keys, type bars having sliding movement to and from the keys, the type bars being provided with stepped members for engagement with the keys to limit their movement in direction of said keys, tension devices acting to normally force the type bars in direction of the keys, a carriage for returning the type bars, a printing mechanism associated with the type bars, and means for operating the printing mechanism from the said carriage.

11. In a calculating machine, an adding mechanism, spring-controlled depressible keys, type bars limited in their printing movement by said keys, a printing mechanism operated by the type bars, a controlling means, and a controlling carriage common to all of said factors.

12. In calculating machines, an adding mechanism, spring-controlled detachable keys, type bars limited in their type-setting movement by the keys, a printing mechanism operated by the movement of the type bars, a controlling means for the type bars, which means are likewise common to the printing mechanism, and means for moving the adding mechanism to a point out of the control of the said type bars, whereby figures may be printed at will without an accompanying addition.

13. In a calculating machine, a series of type bars, means for actuating said type bars, keys limiting the movement of the type bars in placing the type in position for printing, a calculating mechanism operated by the movement of the type bars, hammers for moving the type of the type bars, placed in initial position by the movement of said type bars, and means for carrying said hammers down, and for releasing said hammers when the type bars are in position for printing, which means are operated by the controlling means for the type bars.

14. In a calculating machine, a casing, a key-board having independent compressible keys arranged in uniform series, type bars mounted to slide in the casing relatively to the said casing, said type bars being provided with stepped members for engagement with the keys, which type bars comprise an upper type carrying arm and opposing rack arms beneath the type carrying arms, and adjustable shaft, calculating disks loosely mounted thereon, a pinion secured to each disk attached for engagement with either the upper or the lower racks of the type bars, means for communicating motion from one disk to the other, means for imparting individual movement to the type bars, and devices for carrying the pinions of the disks to an engagement with either the upper or the lower racks of the type bars, or out of engagement with both.

15. In a calculating machine, an adding mechanism, a casing, spring-controlled compressible keys carried by the casing, connections between the keys and the adding mechanism, type bars having stepped members for engagement with the keys and having spring-controlled movement in one direction, a carriage for operating the type bars against the tension of their controlling springs, and a printing mechanism operated by the type bars.

16. In a calculating machine, a casing, type bars slidably mounted therein, each type bar being provided with a type-carrying upper arm and opposing racks below the said arms, means for actuating the type bars, a calculating mechanism comprising a shaft, a pivoted support therefor, a series of adding disks loosely mounted on the shaft, means for moving one disk from the other when tens are counted on the disk, a pinion secured to each disk, each pinion being adapted for engagement with a rack arm of a type bar, and a printing mechanism operating in conjunction with the type bars, being controlled partially by the movement of the type bars and partially by the actuating mechanism for said type bars.

17. In a calculating machine, a casing, type bars slidably mounted therein, each type bar being provided with a type-carrying upper arm and opposing racks below the said arms, means for actuating the type bars, a calculating mechanism comprising a shaft, a pivoted support therefor and a series of adding disks loosely mounted on the shaft, means for moving one disk from the other when tens are counted on the disk, a pinion secured to each disk, each pinion being adapted for engagement with a rack arm of a type bar, a printing mechanism operating in conjunction with the type bars, being controlled partially by the movement of the type bars and partially by the actuating mechanism for said type bars, and, a lever mechanism for shifting the pinions of the calculating mechanism to an engagement with either the upper or the lower rack arms of the type bar.

18. In a calculating machine, a casing, type bars slidably mounted therein, each type bar being provided with a type-carrying upper arm and opposing racks below the said arms, means for actuating the type bars, a calculating mechanism comprising a shaft, a pivoted support therefor and a series of adding disks loosely mounted on the shaft, means for moving one disk from the other when tens are counted on the disk, a pinion secured to each disk, each pinion being adapted for engagement with a rack arm of a type bar, a printing mechanism operating in conjunction with the type bars, being controlled partially by the movement of the type bars and partially by the actuating mechanism for said type bars, a lever mechanism for shifting the pinions of the calculating mechanism to an engagement with either the upper or the lower rack arms of the type bar, and means for holding the pinions of the calculating mechanism between and out of engagement with the upper and lower rack arms of the type bars.

19. In a calculating machine, the combination with a series of spring-controlled compressible keys arranged in rows, a stop device for each row of keys, being displaced by the downward movement of the keys of a row, type bars corresponding in number to the number of rows of keys, each type bar being provided with a stepped member for engagement with the said stop devices and the ends of the depressed keys, actuating devices for the type bars, the forward movement of each type bar being limited by the depressed key in the row of keys corresponding to the particular type bar, a calculating mechanism operated by the movement of the type bars, means for raising and lowering the calculating mechanism, a stop device for the calculating mechanism, operated by the said means for raising and lowering said calculating mechanism, and a printing mechanism operating in conjunction with the type bars, partially through the movement of said type bars and partially by the actuating mechanism for said parts.

20. In a calculating machine, a type bar comprising an upper type-carrying arm, opposing racks below the said type carrying arm, one of which racks has end movement, a locking device for the movable rack, a trip for the locking device, and a member extending from the said type bar below the lower rack, which member is adapted to limit the movement of the rack in one direction.

21. In a calculating machine, the combination with a row of compressible spring-controlled keys, of a type bar provided with an upper type-carrying arm, an intermediate fixed rack and an opposing lower spring-controlled rack having end movement and capable at each of said movements to travel the distance of a tooth, a locking and a trip device for the movable rack, and a stepped member that extends from the lower portion of said type bar below and independent of said movable rack, the stepped member being adapted for engagement with one of said keys when said key is depressed.

22. In a calculating machine, the combination with rows of depressible, spring-controlled keys, the keys of each row being in groups, of a series of type bars movable to and from the rows of keys, one type bar being provided for each row of keys, each type bar consisting of a type-carrying upper arm and opposing racks below the said type-carrying arms, one of which racks has spring-controlled end movement, a locking device for the movable rack and a trip for the locking device, an adding mechanism consisting of a pivotally supported shaft located between the racks of the type bars, adding disks loosely mounted on the shaft, pinions secured to the adding disks, adapted for engagement with either rack, and projections from the said adding disks, adapted to act upon the trip devices for the locking means of the lower racks.

23. In a calculating machine, the combination with rows of depressible, spring-controlled keys, the keys of each row being in groups, of a series of type bars movable to and from the rows of keys, one type bar being provided for each row of keys, each type bar consisting of a type-carrying upper arm and opposing racks below the said type-carrying arms, one of which racks has spring-controlled end movement, a locking device for the movable rack and a trip for the locking device, an adding mechanism consisting of a pivotally supported shaft located between the racks of the type bars, adding disks loosely mounted on the shaft, pinions secured to the adding disks, adapted for engagement with either rack, projections from the said adding disks, adapted to act upon the trip devices for the locking means of the lower racks, means for carrying the said pinions in engagement with either rack, locking devices for the pinions, acting thereon as the said calculating mechanism is raised, and a printing mechanism acting in conjunction with the type-carrying arms of the said racks.

24. In a calculating machine, the combination with rows of spring-controlled compressible keys, the keys of each row being in groups, a series of type bars slidable to and from the said rows of keys, each type bar consisting of an upper type-carrying arm, an intermediate fixed rack arm and an opposing lower rack arm having end movement, a locking arm for the lower rack arm and a trip for the locking arm, each rack bar being provided with a stepped member adapted for engagement with a depressed key, initial stop devices for the said stepped members of the rack bars, which initial stop devices are acted upon by the said keys, and means for moving the type bars to and from the keys, of a calculating mechanism consisting of a pivotally supported shaft extending between the rack arms of all of the type bars, adding disks loosely mounted on the shaft, projections from the adding disks for engagement with the said trip devices, pinions secured to the said disks, locking devices for the disks, means for raising and lowering the pivoted supports for the said shaft, and a printing mechanism acting in conjunction with the said disks, being operated by the means for actuating the type bars.

25. In a calculating machine, the combination with rows of spring-controlled compressible keys, the keys of each row being in groups, a series of type bars slidable to and from the said rows of keys, a type bar being opposite each row of keys, each type bar consisting of an upper type-carrying arm, an intermediate fixed rack arm and a lower opposing rack arm having end movement, a locking arm for the lower rack arm and a trip for the locking arm, each rack bar being provided with a stepped member adapted for engagement with a depressed key, initial stop devices for the said stepped members of the rack bars, which initial stop devices are acted upon by the said keys, and means for moving the type bars to and from the keys, of a calculating mechanism, consisting of a pivotally supported shaft extending between the rack arms of all of the type bars, adding disks loosely mounted on the shaft, projections from the adding disks for engagement with the said trip devices, pinions secured to the said disks, locking devices for the disks, means for raising and lowering the pivoted supports for the said shaft, a printing mechanism acting in conjunction with the said disks, being operated by the means for actuating the type bars, and an alining device for the type-carrying arms automatically operated by the means for moving the said type bars in direction of the said keys.

26. In a calculating machine, the combination with a movable type-carrying arm, of a hammer for the type of said arm, a shaft on which said hammer is mounted, the hammer being adapted to turn with the shaft, a depressing arm for the hammer, means operated by the type-carrying arm to bring the depressing arm into locking engagement with the hammer, and means for turning the said shaft when the depressing arm and hammer are engaged.

27. In a calculating machine, the combination with a movable type-carrying arm and a spring-controlled tumbler controlled by the said arm, the said tumbler being provided with a striking plate, of a spring-controlled hammer, a shaft upon which the said hammer is mounted, a pivotally-supported spring-controlled depressing arm carried by the same shaft as the hammer, which depressing arm is forced to locking engagement with the said hammer by the striking plate of the said tumbler, and a trip for the depressing arm, located below the hammer, whereby to release the said hammer after it has been carried down by engagement with the depressing arm.

28. In a calculating machine, the combination with a movable type-carrying arm, a spring-controlled tumbler the movement of which is controlled by the movement of the said type-carrying arm, and a striking plate for the said tumbler, of a shaft, a spring-controlled hammer loosely mounted on the shaft, a frame secured to the said shaft and extending in front of the said hammer, a depressing arm pivoted in the said frame and arranged for interlocking engagement with the hammer, being carried to such engagement by said tumbler, means for turning the said shaft, and a trip for the depressing arm located in the downward path of its supporting frame, whereby to release the depressing arm from the hammer after said arm has carried the hammer down.

29. In a calculating machine, the combination with a series of parallel type-carrying arms, a support in which the said arms have movement, a tumbler located in said support, one below each of said arms, each tumbler being independently controlled by the type-carrying arm above it, and graduated striking plates at the outer ends of the said tumblers, of a shaft, a spring-controlled frame carried by said shaft, depressing arms, one for each striking plate, pivoted in the said frame, a hammer for each type-carrying arm, a hammer being located adjacent to each depressing arm, said hammers being spring-controlled and loosely mounted on the said shaft, the opposing faces of the depressing arms and hammers being arranged for interlocking engagement, means for turning the shaft, and a trip below the shaft, adapted for engagement with the depressing arms to release them from engagement with their respective hammers.

30. In a calculating machine, the combination with a casing, parallel type-carrying arms having independent sliding movement in the casing, a tumbler below each type-carrying arm also mounted in the casing, each tumbler being independently controlled by its respective type-carrying arm, and striking plates secured to the outer ends of the tumblers, the said plates being graduated in length, the longest plate covering all of the others, of a shaft, a spring-controlled frame carried by the shaft, spring-controlled hammers for the type in the said type-carrying bars loosely mounted on the said shaft, a spring-controlled frame secured to the said shaft, depressing arms pivotally mounted in the said frame, adapted for interlocking engagement one with each of the said hammers and for engagement with the said striking plates, each depressing arm being provided with an extension below its respective hammer, a trip device for the extensions of all of the depressing arms, and means for turning said shaft.

31. In a calculating machine, the combination with a casing, a series of spring-controlled tumblers mounted in the casing and having limited movement therein, a corresponding series of type-carrying arms located one above each tumbler, the movement of the tumblers being controlled by the movement of the said type-carrying arms, and graduated striking plates at the outer ends of said tumblers, the striking plate of one outer tumbler being of corresponding width thereto, the striking plate for the opposite outer tumbler covering the striking plates of all of the tumblers, of a shaft, means for rotating the same, a trip located below said shaft, a series of spring-controlled hammers loosely mounted on the shaft, one for each type-carrying arm, each of said hammers being provided with a recess in its outer end or end facing the type-carrying arms, a spring-controlled frame carried by said shaft, a series of angular depressing arms pivoted in said frame, the striking members whereof are engaged by said striking plates, a vertical member of each depressing arm being opposite the recessed end of a hammer, a tongue extending from the vertical member of each depressing arm, adapted to be forced to enter a slot in its corresponding hammer by the outward movement of the corresponding tumbler, the horizontal members of the depressing arms being adapted for releasing engagement with the releasing device when said hammers have been carried to their farthest downward point.

32. In a calculating machine, slidable type bars, a printing and adding mechanism operatively connected with the type bars, a detent mechanism for the type bars, a carriage common to the printing and the adding mechanism and to the type bars, and means for operating the said detent mechanism by the movement of the said carriage.

In testimony whereof I have signed my name to this specification in the presence of two subscribing witnesses.

CARL L. NELSON.

Witnesses:
J. FRED ACKER,
JNO. M. RITTER.